US012608492B2

(12) United States Patent
Madhwani et al.

(10) Patent No.: US 12,608,492 B2
(45) Date of Patent: Apr. 21, 2026

(54) EXTERNAL MULTI-CHANNEL COMMUNICATION MODULARIZATION, ROUTING, TRANSMISSION, AND ACCESS CONTROL IN A DATABASE SYSTEM

(71) Applicant: Salesforce, Inc., San Francisco, CA (US)

(72) Inventors: Dena Madhwani, Livermore, CA (US); Dinesh Rohra, Dublin, CA (US); Aizaz Hakro, San Ramon, CA (US); Xuefeng Wang, Cupertino, CA (US); Michael Macasek, Pembroke, MA (US); Zihan Yi, Palo Alto, CA (US); Fabiha Hannan, San Francisco, CA (US); Xuejing Zhu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 78 days.

(21) Appl. No.: 18/590,422

(22) Filed: Feb. 28, 2024

(65) Prior Publication Data

US 2025/0260741 A1     Aug. 14, 2025

Related U.S. Application Data

(60) Provisional application No. 63/551,467, filed on Feb. 8, 2024.

(51) Int. Cl.
*H04L 67/141* (2022.01)
*G06F 21/60* (2013.01)
(Continued)

(52) U.S. Cl.
CPC ........ *G06F 21/604* (2013.01); *G06F 21/6227* (2013.01); *H04L 41/16* (2013.01);
(Continued)

(58) Field of Classification Search
CPC ...... H04L 67/141; H04L 41/16; H04L 67/148
See application file for complete search history.

(56) References Cited

U.S. PATENT DOCUMENTS 6,032,184 A     2/2000   Cogger
6,769,009 B1    7/2004   Reisman
(Continued)

FOREIGN PATENT DOCUMENTS

CN      117715119 A    3/2024
CN      113710338 B    10/2024

OTHER PUBLICATIONS

Office Action (Non-Final Rejection) dated Sep. 10, 2025 for U.S. Appl. No. 18/590,430 (pp. 1-10).
(Continued)

*Primary Examiner* — Nazia Naoreen
(74) *Attorney, Agent, or Firm* — Polygon IP, LLP

(57)     ABSTRACT

A request to establish a communication session from an end point to a tenant of a computing services environment may be received from an external computing system managed by an external entity in accordance with a designated communication package definition configured by the external entity and defining access information for a designated communication channel outside of the computing services environment. An agent account of a plurality of agent accounts associated with the tenant may be determined based on routing configuration information specified in the designated communication package definition. The communication session may be established via the designated communication channel from the end point through the external computing system and the computing services environment to a first client machine authenticated to the agent account. One or more messages may be transmitted from the end point to the first client machine via the communication session.

20 Claims, 23 Drawing Sheets

(51) Int. Cl.
| | |
|---|---|
| *G06F 21/62* | (2013.01) |
| *H04L 9/40* | (2022.01) |
| *H04L 41/16* | (2022.01) |
| *H04L 67/148* | (2022.01) |

(52) U.S. Cl.
CPC ............. *H04L 63/08* (2013.01); *H04L 63/10* (2013.01); *H04L 67/141* (2013.01); *H04L 67/148* (2013.01)

(56) References Cited

U.S. PATENT DOCUMENTS

| | | | |
|---|---|---|---|
| 7,693,745 | B1 | 4/2010 | Pomerantz |
| 9,906,607 | B2 * | 2/2018 | Lawson ................ H04L 67/141 |
| 11,087,333 | B2 | 8/2021 | Kuchoor et al. |
| 11,520,797 | B2 | 12/2022 | Blank et al. |
| 12,159,119 | B2 * | 12/2024 | Heller .................... G06F 40/56 |
| 12,321,939 | B2 | 6/2025 | Basu |
| 2009/0259757 | A1 | 10/2009 | Ben-Shachar |
| 2010/0075283 | A1 | 3/2010 | Rees |
| 2014/0279596 | A1 | 9/2014 | Waris |
| 2017/0251868 | A1 | 9/2017 | Stork |
| 2017/0351868 | A1 | 12/2017 | Jacob |
| 2021/0035113 | A1 | 2/2021 | Kuchoor et al. |
| 2022/0188319 | A1 | 6/2022 | Blank et al. |
| 2022/0321642 | A1 | 10/2022 | Xu et al. |
| 2023/0185957 | A1 | 6/2023 | Brown |
| 2024/0290330 | A1 * | 8/2024 | Lu .......................... G10L 15/063 |
| 2025/0078822 | A1 * | 3/2025 | Perkins ............... H04M 3/5166 |
| 2025/0086403 | A1 | 3/2025 | Pitkin |

OTHER PUBLICATIONS

Office Action dated Aug. 8, 2025 for U.S. Appl. No. 18/590,412 (pp. 1-21).

* cited by examiner

Partner Space 312

Custom Communication Package 314

Custom Platform Event 318

Partner Metadata 316

Conversation Channel Definition 320

Connected Application 324

Contact Center Scope 322

Tenant Space 302

Conversation Channel Entity Interface 304

Channel Key 324

Channel Type 326

Channel Address Identifier 328

Channel Definition 330

Messaging Channel 308

Contact Center Channel 310

Call Center 306

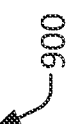
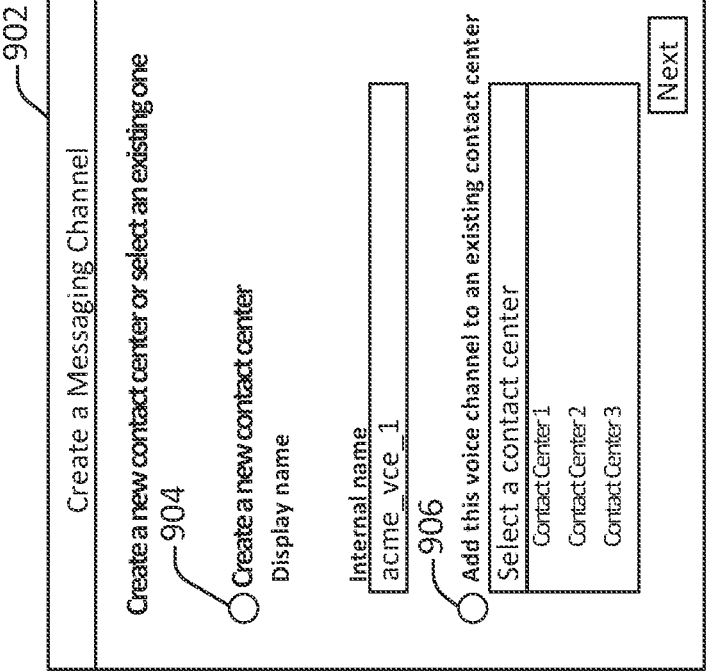
Figure 9

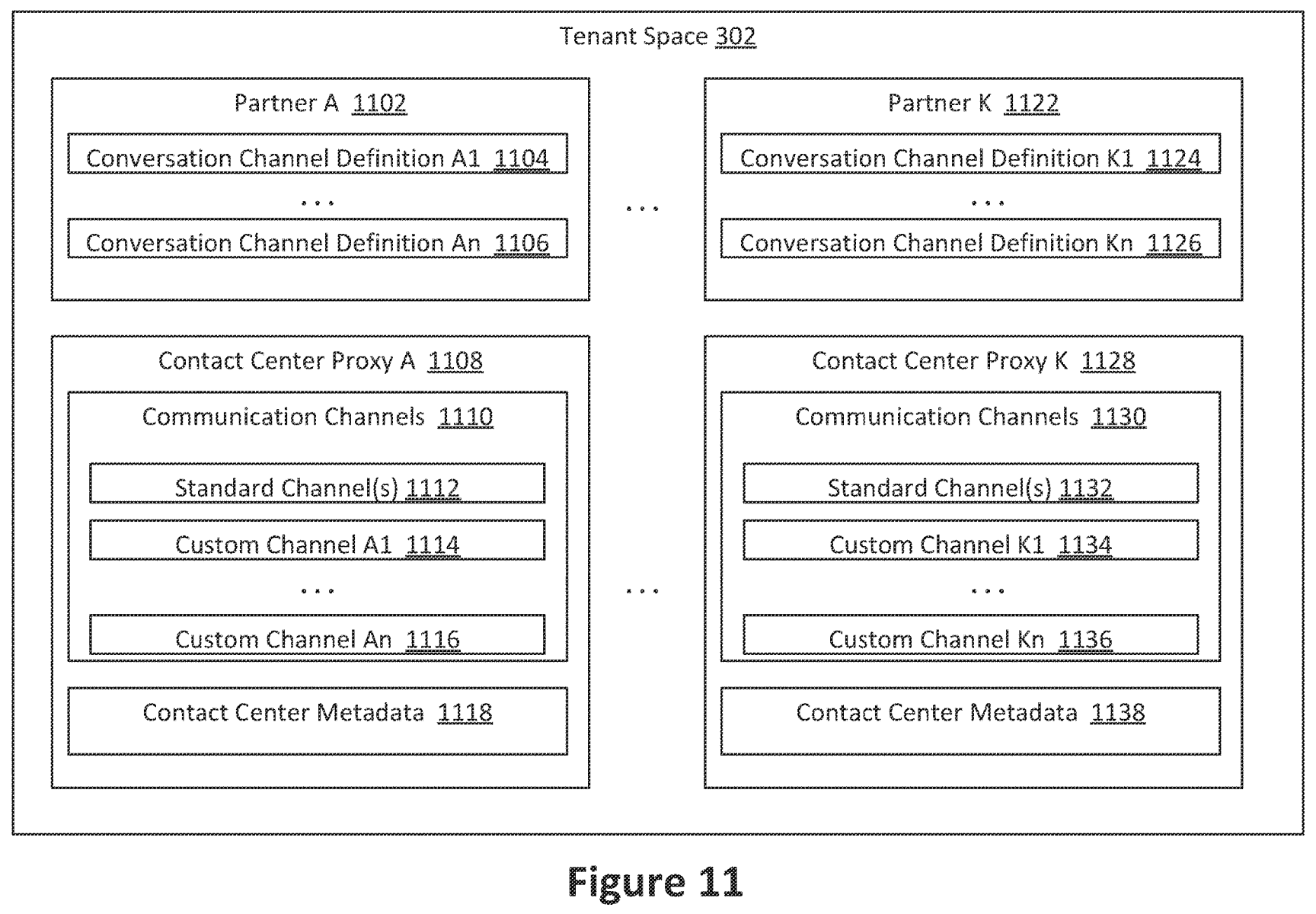

Tenant Space 302

Partner A  1102

Conversation Channel Definition A1  1104

...

Conversation Channel Definition An  1106

Contact Center Proxy A  1108

Communication Channels  1110

Standard Channel(s) 1112

Custom Channel A1  1114

...

Custom Channel An  1116

Contact Center Metadata  1118

Partner K  1122

Conversation Channel Definition K1  1124

...

Conversation Channel Definition Kn  1126

Contact Center Proxy K  1128

Communication Channels  1130

Standard Channel(s) 1132

Custom Channel K1  1134

...

Custom Channel Kn  1136

Contact Center Metadata  1138

Figure 11

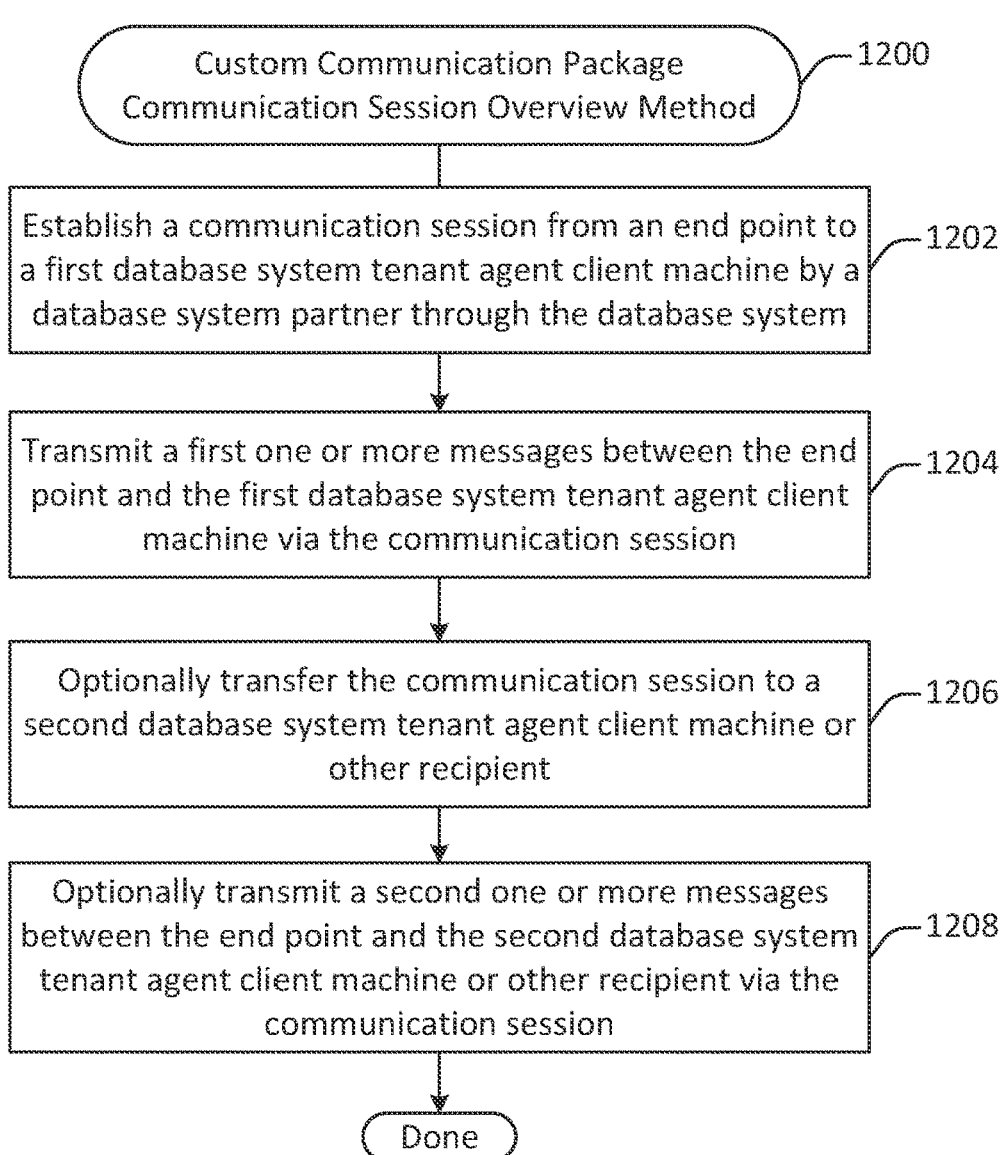

Custom Communication Package
Communication Session Overview Method ⌐1200

Establish a communication session from an end point to
a first database system tenant agent client machine by a
database system partner through the database system ⌐1202

Transmit a first one or more messages between the end
point and the first database system tenant agent client
machine via the communication session ⌐1204

Optionally transfer the communication session to a
second database system tenant agent client machine or
other recipient ⌐1206

Optionally transmit a second one or more messages
between the end point and the second database system
tenant agent client machine or other recipient via the
communication session ⌐1208

Done

Figure 12

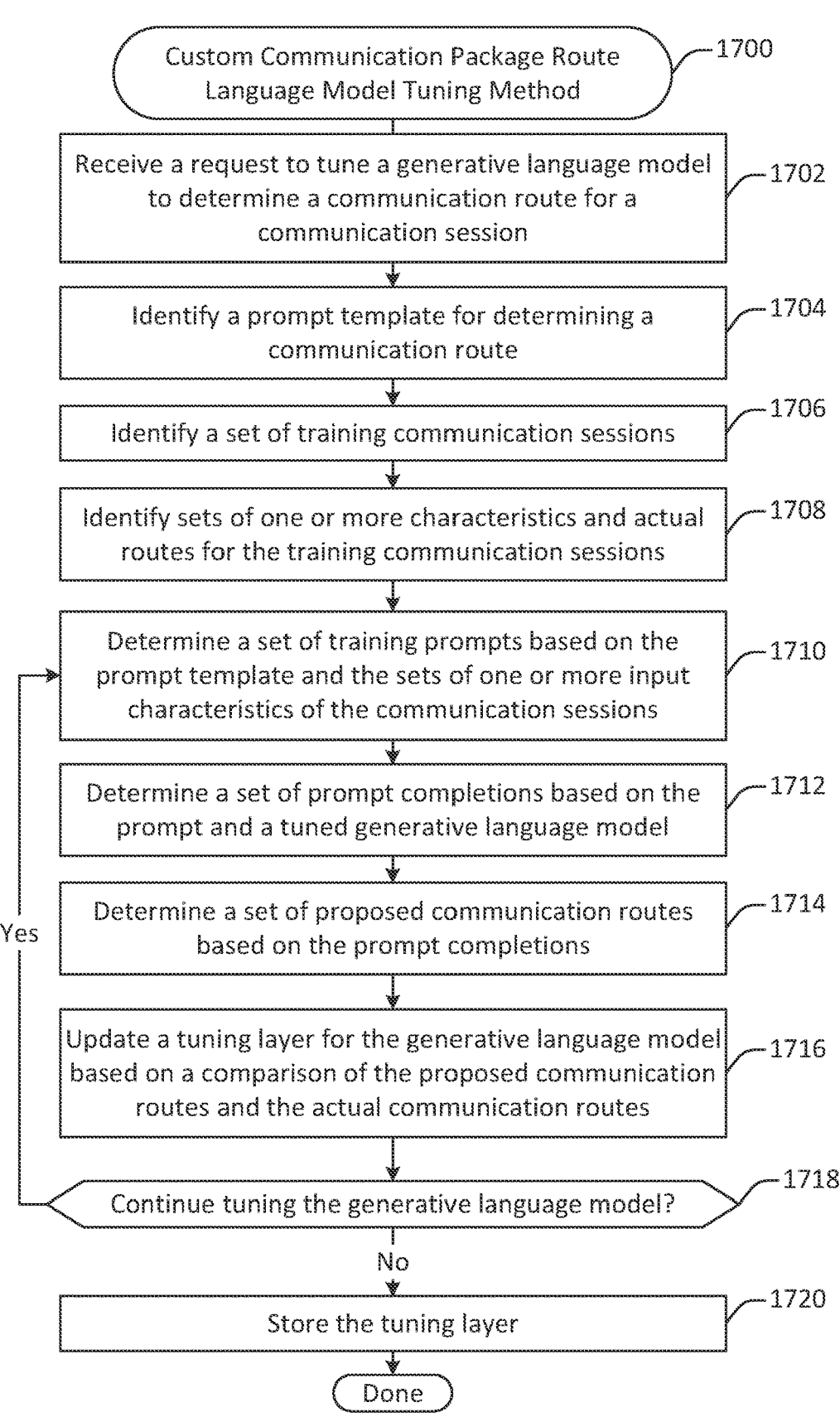

Custom Communication Package Route Language Model Tuning Method ──1700

Receive a request to tune a generative language model to determine a communication route for a communication session ──1702

Identify a prompt template for determining a communication route ──1704

Identify a set of training communication sessions ──1706

Identify sets of one or more characteristics and actual routes for the training communication sessions ──1708

Determine a set of training prompts based on the prompt template and the sets of one or more input characteristics of the communication sessions ──1710

Determine a set of prompt completions based on the prompt and a tuned generative language model ──1712

Determine a set of proposed communication routes based on the prompt completions ──1714

Update a tuning layer for the generative language model based on a comparison of the proposed communication routes and the actual communication routes ──1716

Continue tuning the generative language model? ──1718

Yes

No

Store the tuning layer ──1720

Done

Figure 17

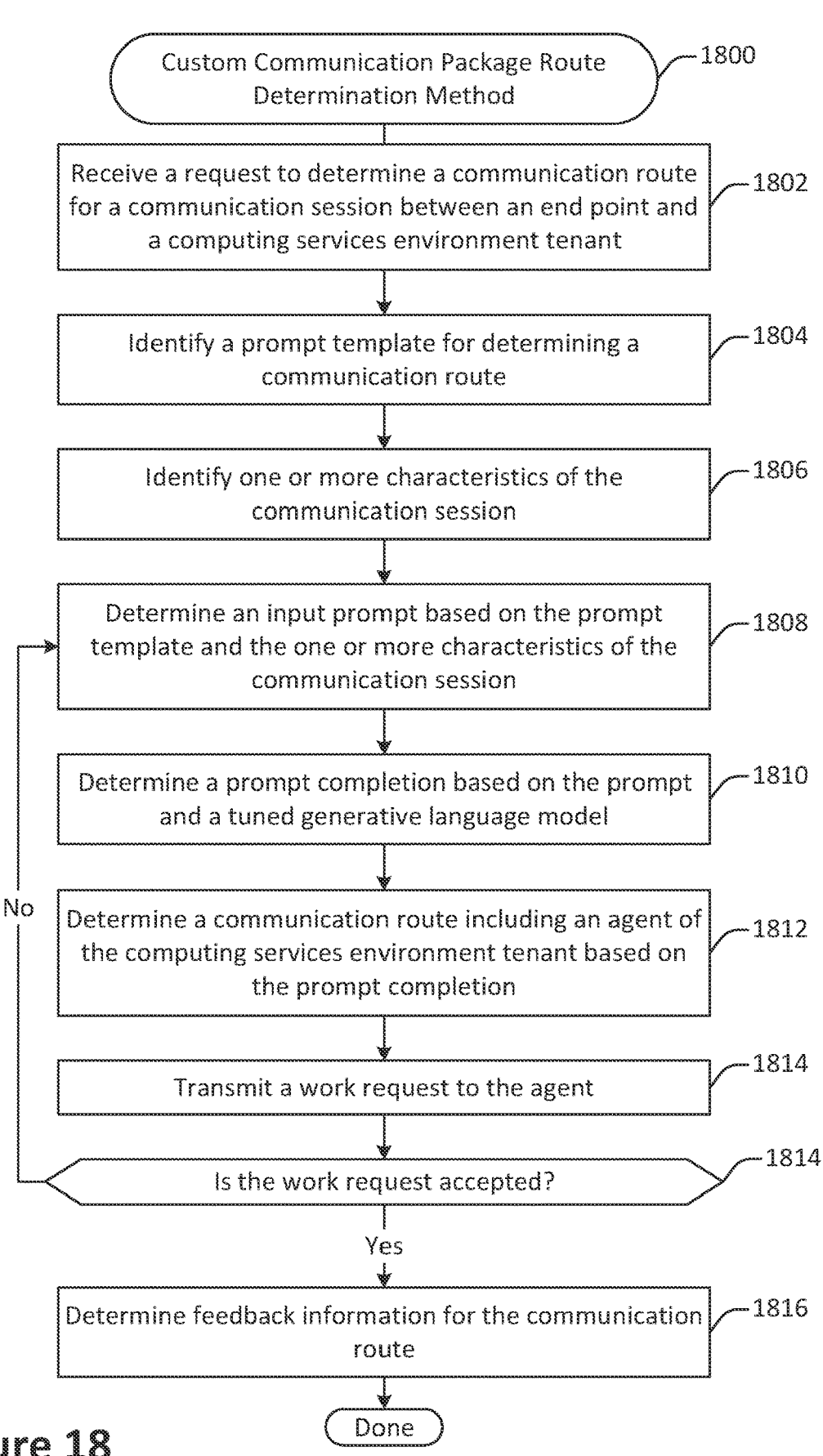

Custom Communication Package Route Determination Method — 1800

Receive a request to determine a communication route for a communication session between an end point and a computing services environment tenant — 1802

Identify a prompt template for determining a communication route — 1804

Identify one or more characteristics of the communication session — 1806

Determine an input prompt based on the prompt template and the one or more characteristics of the communication session — 1808

Determine a prompt completion based on the prompt and a tuned generative language model — 1810

Determine a communication route including an agent of the computing services environment tenant based on the prompt completion — 1812

Transmit a work request to the agent — 1814

Is the work request accepted? — 1814

No

Yes

Determine feedback information for the communication route — 1816

Done

Figure 18

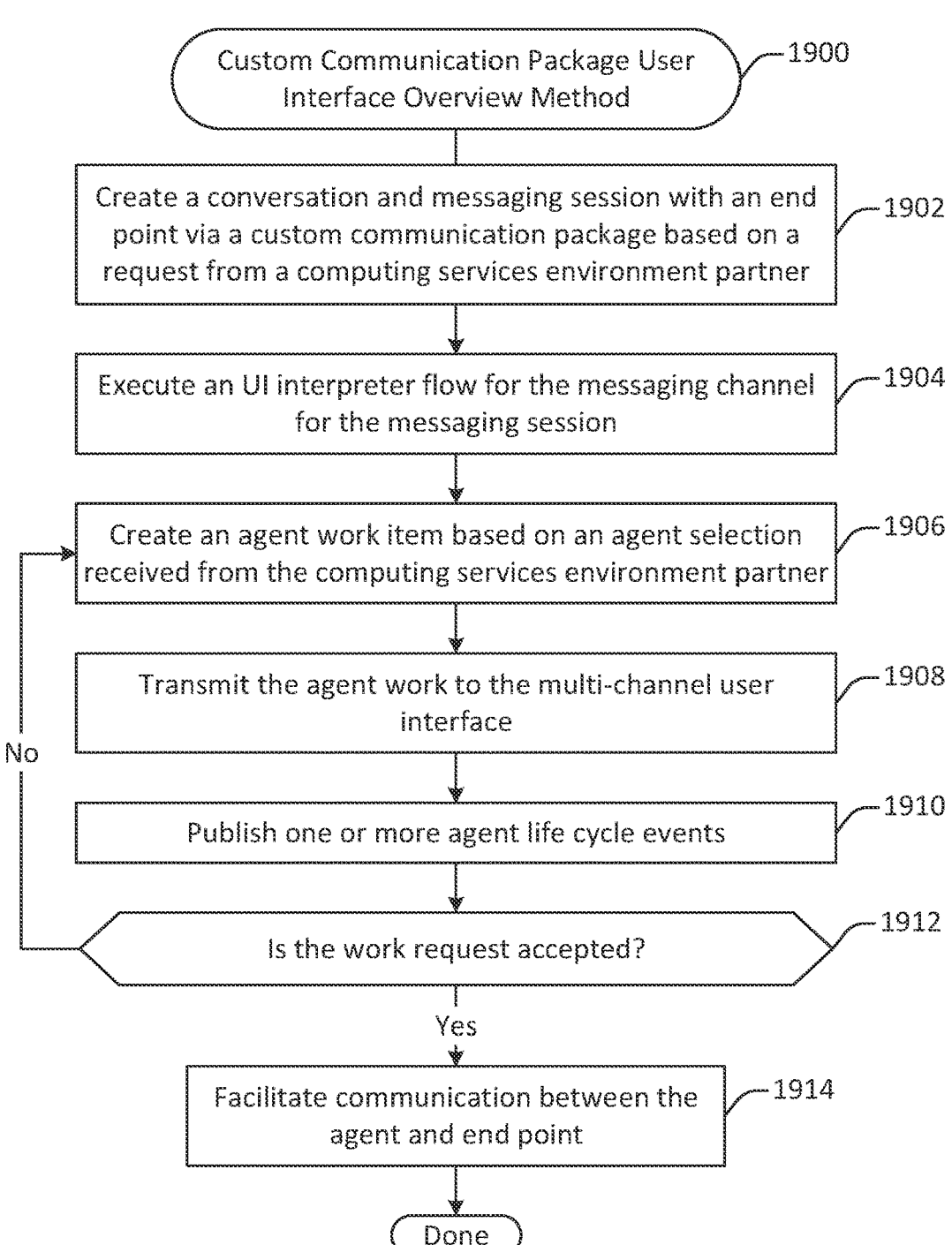

Custom Communication Package User Interface Overview Method ⟵1900

Create a conversation and messaging session with an end point via a custom communication package based on a request from a computing services environment partner ⟵1902

Execute an UI interpreter flow for the messaging channel for the messaging session ⟵1904

Create an agent work item based on an agent selection received from the computing services environment partner ⟵1906

Transmit the agent work to the multi-channel user interface ⟵1908

Publish one or more agent life cycle events ⟵1910

Is the work request accepted? ⟵1912

No

Yes

Facilitate communication between the agent and end point ⟵1914

Done

Figure 19

EXTERNAL MULTI-CHANNEL COMMUNICATION MODULARIZATION, ROUTING, TRANSMISSION, AND ACCESS CONTROL IN A DATABASE SYSTEM

CROSS-REFERENCE TO RELATED APPLICATIONS

This patent application claims priority under 35 U.S.C. 120 to Provisional U.S. Patent Application No. 63/551,467, filed Feb. 8, 2024 by Madhwani et al., titled "EXTERNAL MULTI-CHANNEL COMMUNICATION MODULARIZATION, ROUTING, TRANSMISSION, AND ACCESS CONTROL IN A DATABASE SYSTEM", which is hereby incorporated by reference in its entirety and for all purposes.

FIELD OF TECHNOLOGY

This patent application relates generally to database systems, and more specifically to communication supported via database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One example of such a task is conducting communication between entities and contacts. Entities employ a variety of different communication channels and services through which to communicate with contacts. Supporting and facilitating communication through this variety of communication channels and services presents significant technical challenges to providers of computing services environments. Accordingly, improved techniques for communication channel support are desired.

BRIEF DESCRIPTION OF THE DRAWINGS

The included drawings are for illustrative purposes and serve only to provide examples of possible structures and operations for the disclosed inventive systems, apparatus, methods, and computer program products for communication channel modularization. These drawings in no way limit any changes in form and detail that may be made by one skilled in the art without departing from the spirit and scope of the disclosed implementations.

FIG. 9 illustrates a user interface generated in accordance with one or more embodiments.

FIG. 11 illustrates a view of a tenant space, configured in accordance with one or more embodiments.

FIG. 12 illustrates an overview method for conducting a communication session via a custom communication package, performed in accordance with one or more embodiments.

FIG. 17 illustrates a method for tuning a generative language model for routing communication sessions conducted via a custom communication package, performed in accordance with one or more embodiments.

FIG. 18 illustrates a method for determining a route for a communication session conducted in accordance with a custom communication package, performed in accordance with one or more embodiments.

FIG. 19 illustrates a custom communication package user interface overview method, performed in accordance with one or more embodiments.

DETAILED DESCRIPTION

Introduction

Figure 1:
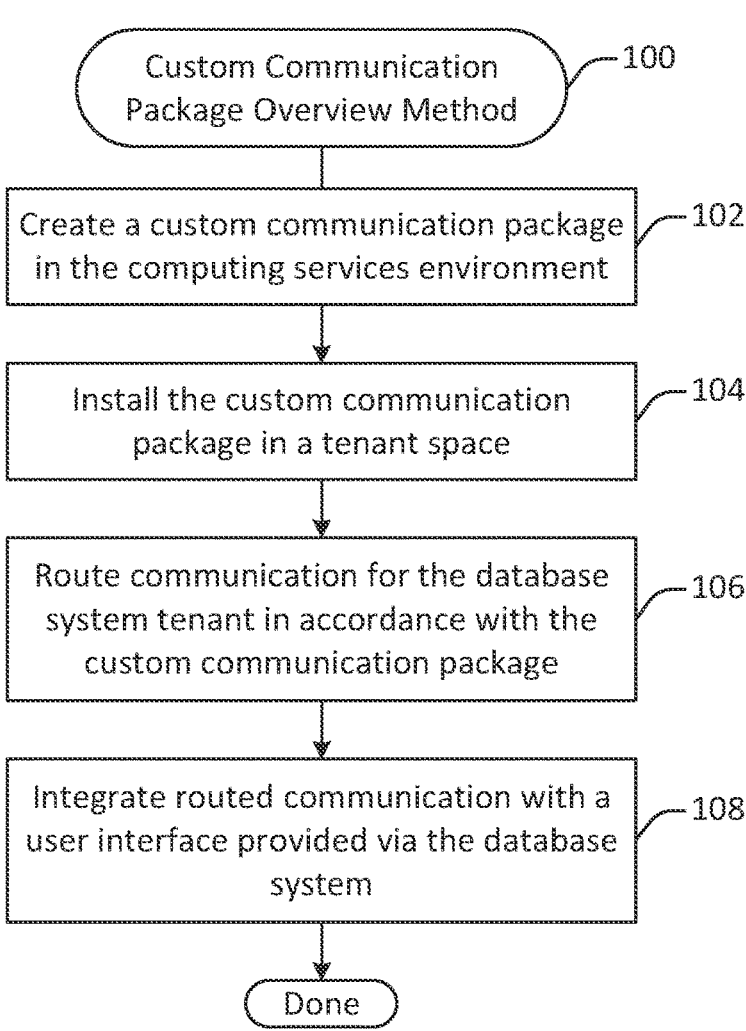
FIG. 1 illustrates a custom communication package overview method, performed in accordance with one or more embodiments.

Techniques and mechanisms described here relate to communication and services between computing devices linked to different entities. According to various embodiments, a "service provider" entity provides, configures, and controls a computing services environment, which in turn may provide computing services via the internet. These computing services may be accessed by "tenants" of the computing services environment, which may include entities such as businesses or other organizations. These tenants may have "contacts" such as customers or suppliers, which may be individuals or organizations. The tenants may interact with these contacts both through the computing services environment and outside the computing services environment. The service provider may also coordinate with one or more "partners", which are entities that provide additional services through the computing services environment that supplement the services provided by the service provider.

In some embodiments, an entity may fulfill more than one role within the overall ecosystem. For example, a single company may be a tenant of the computing services environment, a partner to the computing services environment, and a contact of another tenant within the computing services environment.

The term "tenant" as used herein should not be confused with the concept of "multitenancy" in the database context. In some implementations, information associated with the various entities discussed herein may be stored in a database system within the computing services environment. The database system may or may not be configured as a multitenant database. Thus, a tenant of the computing services environment may have information stored in a database system within the computing services environment, and that database system may or may not be configured as a multitenant database. The techniques and mechanisms described herein apply broadly to a large variety of configurations of database systems and computing services environments.

According to various embodiments, various types of services may be accessed via the computing services environment. For example, the computing services environment may provide various services that pertain to customer relations management. Such services may include, for instance, database systems storing customer relations management data, user interfaces through which the customer relations management data may be accessed, communication interfaces through which tenants may communicate with contacts represented in the customer relations management data, and the like.

Techniques and mechanisms described herein relate broadly to third-party communication channels through which tenants can communicate with contacts within the framework of services provided by the computing services environment. For instance, a computing services environment tenant may seek to communicate with its contacts through a communication service such as WhatsApp, Slack, or Microsoft Teams while managing customer relations management activities and data through a user interface that provides access to customer relations management data stored in the computing services environment. In some configurations, the computing services environment may natively provide such functionality for some such third-party services. However, hundreds or thousands of such communication services exist. Moreover, new communication services appear frequently, while existing communication services change or disappear. Keeping up with these changes presents the service provider of the computing services environment with a significant technical challenge, since each communication service needs to be connected to the computing services environment in order to be supported, with the connection involving elements such as event handling, message passing, communication routing, and more.

According to various embodiments, techniques and mechanisms described herein provide tenants and partners of a computing services environment service provider with the ability to add functionality to the computing services environment that allows for communication via an arbitrary third-party communication channel. The third-party communication channel may support voice, video, text messaging, or a combination thereof, and may be provided through a service that resides outside of the computing services environment. For instance, the third-party communication channel may be provided by a different service provider than the service provider of the computing services environment.

In some implementations, the support for arbitrary third-party communication channels allows the tenant to conduct communication with their contacts via whichever communication channel is most convenient to them, while at the same time taking advantage of services provided via the computing services environment. For example, the computing services environment may provide customer relations management services such as case management, routing, workflows, automation, and more.

In some embodiments, to facilitate the flexibility of supporting arbitrary third-party communication channels, the computing services environment may provide and/or support a variety of types of interactions. For example, the computing services environment may provide user interfaces and functionality for supporting communication channel setup metadata and packaging, a communication channel setup and administration, communication channel architecture and refactoring, tenant agent login and workflow, agent lifecycle actions (e.g., accepting, declining, and closing connections), agent communication routing and status syncing, timed after-conversation work transfer, capacity syncing, agent-initiated outbound messaging, and/or other such operations.

When using conventional techniques, tenants of a computing services environment must rely on a standardized, one-size-fits-all contact center provided by a computing services environment. A standard contact center is typically configured with a fixed number of communication channels configured by the service provider of the computing services environment. In contrast to conventional techniques, various embodiments described herein provide for modularization of a contact center within the computing services environment. In such a system, tenants and partners of the computing services environment can customize the contact center to include different communication channels not provided by the service provider of the computing services environment. Such customization can be provided through a custom communication package generated and configured by a partner or tenant of the computing services environment.

When using conventional techniques, configuration of a computing services environment involves manual selection of configuration parameters. Such an approach can be cumbersome and difficult, particularly given the complexity of a modern and full-featured computing services environment. In contrast to conventional techniques, various embodiments described herein provide for the generation of a custom communication package using generative language output determined by a generative language model. A generative language model may be used to generate new database entities, configuration parameters, and other types of information used by the computing services environment to implement the custom communication package.

When using conventional techniques, communication routing is performed by the computing services environment. However, such approaches are inherently limited given that different tenants may prefer different approaches to routing. In contrast to conventional techniques, various embodiments described herein provide for routing protocols that are customized by tenants and/or partners of the computing services environment. Such routing may be configurable and may support the transmission of capacity information for agents of tenants. Moreover, such routing may be conducted using generative language models or other artificial intelligence models that learn to adaptively route communication based on the routing of prior communication, natural language instruction, and/or encoded rules. For instance, routing may be based on analysis of communication sentiment, customer feedback, agent skills, communication topic, communication value, contact history, and/or other such considerations.

According to various embodiments, techniques and mechanisms described herein may involve the configuration of an application procedure interface through which the computing services environment can be accessed. The application procedure interface may provide functionality such as establishing a communication session, interactions via a communication session, routing, cancelation of routing, the creation of work for agents, and/or other operations.

FIG. 1 illustrates a custom communication package overview method 100, performed in accordance with one or more embodiments. The method 100 may be performed at a computing services environment. Various elements included in a computer services environment are illustrated in and discussed with respect to FIG. 2, FIG. 3, FIG. 4, FIG. 5, FIG. 6, and FIG. 7, as well as generally throughout the application. The operations shown in the method 100 are discussed in additional detail throughout the application.

At 102, a customer communication package is created in the computing services environment. According to various embodiments, creating the custom communication package may involve operations such as determining a connected communication platform, one or more custom platform events, partner metadata, and a conversation channel definition. The custom communication package may be published to the computing services environment so that it may be accessed by a tenant of the computing services environment.

At 104, the custom communication package is installed in a tenant space for a tenant of the computing services environment. In some implementations, the tenant space may include various packages, configuration settings, data, and other elements accessible to and controlled by the tenant, including the custom communication package. Installing the custom communication package may involve creating or updating one or more settings to render the custom communication package accessible to computing devices authenticated to computing services environment accounts associated with the tenant.

Communication for the database system tenant is routed in accordance with the custom communication package at 106. In some embodiments, routing communication in accordance with the custom communication package may involve routing incoming communications, routing outgoing communications, transferring active communication sessions, and transmitting communications in accordance with active communication sessions conducted via the third-party communication channel or channels accessible via the custom communication package.

Routed communication is integrated with a user interface provided by the database system at 108. In some embodiments, the user interface may be provided to a client machine authenticated to a user account linked with the tenant. For instance, the user account may be associated with an agent, such as a customer service agent, responsible for communicating with contacts on behalf of the tenant. The user interface may be provided in the context of a web application such as an application used to provide customer relations management services.

System Architecture

Figure 2:
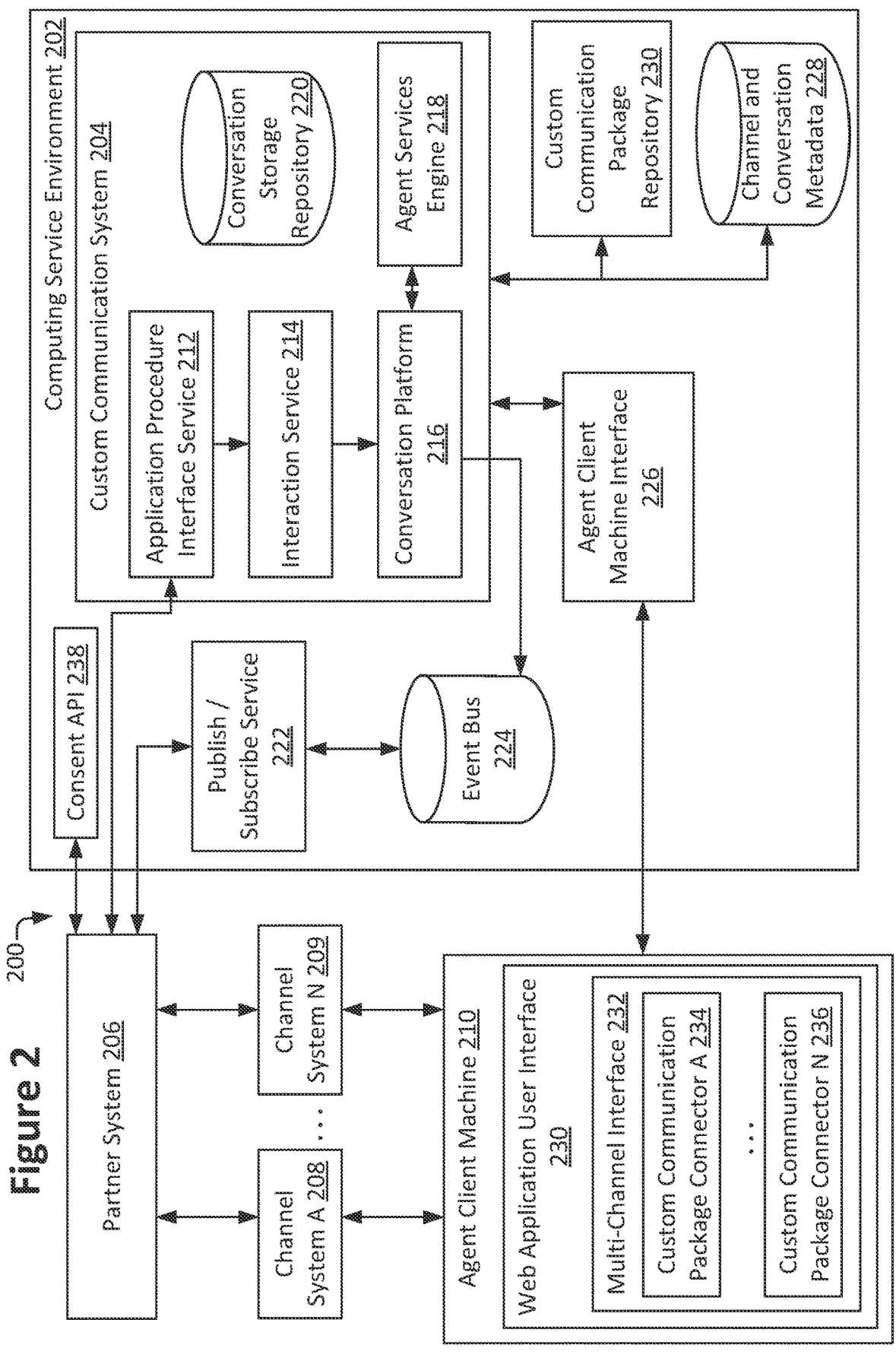
FIG. 2 illustrates a computing services environment ecosystem, configured in accordance with one or more embodiments.

FIG. 2 illustrates a computing services environment ecosystem 200, configured in accordance with one or more embodiments. The computing services environment ecosystem 200 includes a computing services environment 202 which includes a custom communication system 204. The computing services environment ecosystem 200 also includes a partner system 206, one or more channel systems (e.g., the channel system 208 and the channel system 209), and an agent client machine 210. The agent client machine 210 includes a web application user interface 230, which includes an multi-channel interface 232. The multi-channel interface 232 includes some number of custom communication package connectors including the custom communication package connector 234 through the custom communication package connector 236. The computing services environment 202 includes a publish/subscribe service 222, an event bus 224, an agent client machine interface 226, a custom communication package repository 230, and a channel and conversation metadata repository 228. The custom communication system 204 includes an application procedure interface service 212, an interaction service 214, a conversation platform 216, an agent services engine 218, and a conversation storage repository 220. The elements included in FIG. 2 and the associated description are intended to provide an overview of various techniques and mechanisms. Additional details are provided throughout the application.

In some embodiments, a custom communication package may provide access to a third-party communication channel through which communications may be conducted between the agent client machine 210 and a contact (e.g., a customer, a vendor, etc.) of the tenant. Such communications may be transmitted via a channel system specific to the third-party communication channel. The channel system may be controlled by a third-party service provider operating independently from and located outside of the computing services environment 202.

In some implementations, the partner system 206 may configure a custom communication package, which may be stored to the web application user interface 230. A custom communication package stored in the web application user interface 230 may be installed to a tenant space associated with a tenant. A custom communication package may include information such as channel metadata, computing services environment integration, and the like. The installation of a custom communication package to a tenant may trigger the inclusion of a custom communication package connector in an multi-channel interface 232 that resides in a web application user interface 230 in client machines authenticated to user accounts associated with the tenant.

In some embodiments, a partner system 206 that provides functionality via a custom communication package may communicate with the computing services environment 202 via the application procedure interface service 212. For instance, the application procedure interface service 212 may communicate with the partner system 206 via a REST interface.

A communication session conducted via a custom communication package may be initiated based on a request sent from the partner system 206 to the application procedure interface service 212. The request may result in the initiation of a communication session via the interaction service 214 and the conversation platform 216. Partner-facing events related to the communication session may be provided to the event bus 224. Agent-facing information may be sent to the agent services engine 218, from which it may be sent to the agent client machine interface 226 for transmission to the client machine. Records of communication conducted via a custom communication package may be stored in the conversation storage repository 220.

Events that occur in the conversation platform 216 may be published to the event bus 224, where they may be sent to the partner system 206 via the subscribe service 222. For instance, the subscribe service 222 may provide access to events via a general remote procedure call (gRPC) framework.

In some embodiments, the agent client machine 210 may be a computing device authenticated to a user account in the computing services environment that is linked with a tenant of the computing services environment. For instance, the agent client machine 210 may be linked with a user account associated with an agent authorized to communicate with a contact of the tenant on the tenant's behalf.

According to various embodiments, the computing services environment 202 may communicate with the agent client machine 210 via the agent client machine interface 226. For instance, the agent client machine interface 226 may function as an application server through which information is received from the agent client machine 210 and instructions are sent to the agent client machine 210 for presenting the web application user interface 230 at the agent client machine 210.

In some embodiments, the web application user interface 230 may be any of a variety of web applications through which a user at the agent client machine 210 may communicate with a contact. For instance, the web application user interface 230 may be configured for customer relations management operations.

In some implementations, the multi-channel interface 232 may include one or more custom communication package connectors, which may facilitate communicate via a custom communication package. For example, a custom communication package connector may handle communication-related events that occur in the web application user interface 230 and transmit those events to the appropriate channel system 208 and/or the agent client machine interface 226. As another example, a custom communication package connector may handle channel-specific communications received from the agent client machine interface 226 and provide information for updating the web application user interface 230 based on those communications.

According to various embodiments, the computing services environment 202 may include a consent API 238. The consent API may be tasked with updating consent information indicating whether a contact stored in the database system has consented to communication with a tenant via a communication channel. Additional details regarding such operations are discussed with respect to FIGS. 16A and 16B.

According to various embodiments, a custom communication package connector may communicate with a channel system to perform one or more of a variety of tasks. Examples of such tasks many include, but are not limited to, agent login, status syncing, communication routing, and messaging processing.

According to various embodiments, a computing services environment ecosystem 200 and/or a computing services environment 202 may include other elements not shown in FIG. 2. Some examples of such additional components and elements are discussed elsewhere in the application, for instance in FIG. 5, FIG. 6, and FIG. 7.

In FIG. 2, only a single instance of many of the components is shown for the purpose of illustration. According to various embodiments, however, a computing services environment ecosystem 200 may include multiple instances of many of such elements. For example, a computing services environment ecosystem 200 may include multiple client machines, partner systems, and the like. As another example, the same client machine may communicate via multiple channel systems that are managed through custom communication packages provided by different partner systems. Various configurations are possible.

The communication connections shown in FIG. 2 are examples of the flow of communication in accordance with one or more embodiments, and should not be constructed as limiting. That is, the presence of a unidirectional arrow does not imply that communication does not flow in the opposite direction. Similarly, the absence of a direct connection between two components does not imply that the two components are not in communication. Likewise, a connection between two elements does not imply that the elements are necessarily directly connected. For instance, communication may be transmitted through a public or private network through one or more routers, bridges, gateways, and/or other systems and devices.

Figure 3:
FIG. 3 illustrates another view of the computing services environment ecosystem 200.

FIG. 3 illustrates another view of the computing services environment ecosystem 200. The computing services environment ecosystem 200 includes a tenant space 302 and a partner space 312. These spaces include data that is private to the tenant associated with the tenant space 302 and the partner associated with the partner space 312. The elements included within the tenant space 302 and the partner space 312 shown in FIG. 3 represent custom database entities and/or database entity fields for storing information related to a custom communication package provided by the partner to the tenant.

The partner space 312 includes a custom communication package 314 defined by the partner. The custom communication package 314 includes a conversation channel definition 320, which is linked to one or more custom platform events 318, partner metadata 316, and a connected application 324. The connected application 324 is defined by a contact center scope 322 that defines the context within which the connected application is used.

In some embodiments, the conversation channel definition 320 uniquely identifies the custom communication package 314 within the computing services environment 200. The conversation channel definition 320 is linked with the connected application 324 by authentication information such as a connected application Oauth link field. The one or more custom platform events 318 define the types of communication events that may occur in the context of using the custom communication package 314.

The tenant space 302 includes a conversation channel entity interface 304 that defines the custom communication package 314 for the tenant associated with the tenant space tenant space 302. For instance, the channel definition 330 links the conversation channel entity interface 304 to the conversation channel definition 320. The channel key 324 uniquely identifies the communication channel for the tenant. The channel type 326 defines the type of the channel (e.g., messaging, voice, messaging and voice, video, etc.). The channel address identifier 328 uniquely identifies the channel through which communication is conducted.

In some embodiments, communication via the third-party communication channel may be conducted via voice through the call center 306 and/or via text-based messages through the messaging channel 308. Communication sent through these channels may be ultimately routed to a contact center interface in a web application at a client machine via the contact center channel 310.

Figure 4:
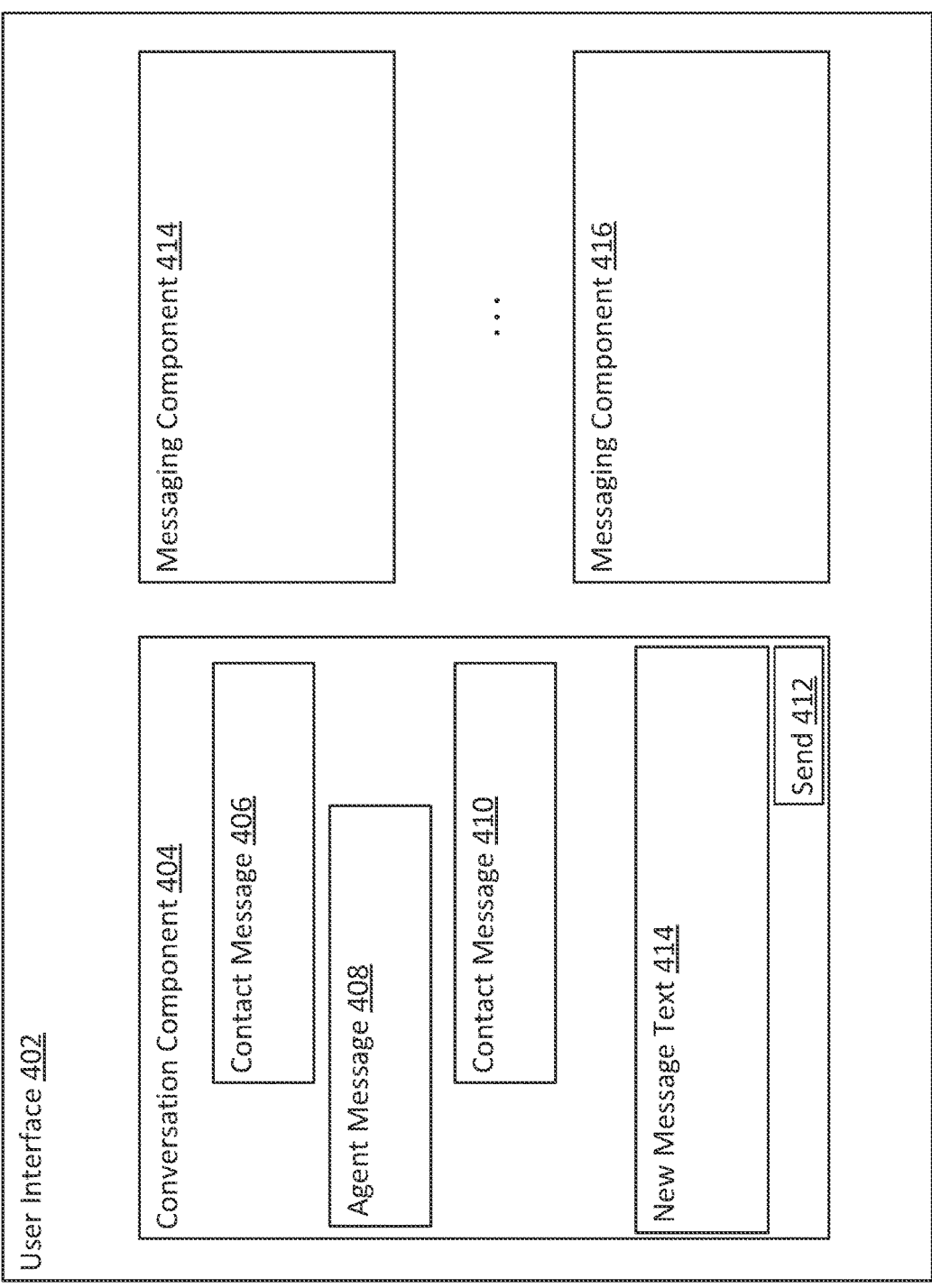
FIG. 4 illustrates a user interface generated in accordance with one or more embodiments.

FIG. 4 illustrates a block diagram of a user interface 402, configured in accordance with one or more embodiments. The user interface 402 may be presented on a client machine associated with the agent. The user interface 402 includes a conversation component 404, which in turn includes messages 406, 408, and 410 between the contact and the agent. The agent may send a new message by entering the text at 414 and sending the message at 412. Additional messaging components are presented at 414 through 416.

According to various embodiments, any of various types of messaging components may be included in a user interface. For example, a user interface may include a messaging component that provides a summary of the conversation generated by a generative language model. Other examples of possible components include, but are not limited to: a work queue providing a list of pending and/or completed work items, a contact directory providing metadata and/or contact information for various contacts associated with the tenant, and a channel directory showing the types of communication channels accessible via the user interface.

According to various embodiments, a tenant may configure the user interface 402 as a contact center, and different tenants may have different configurations of contact centers. Thus, the arrangement and selection of components shown in FIG. 4 is for the purpose of illustration only, and in practice different contact centers may have different configurations. Hence, the user interface 402 may be identical to, may contain, or may be contained within the web application user interface 230 shown in FIG. 2.

Figure 5:
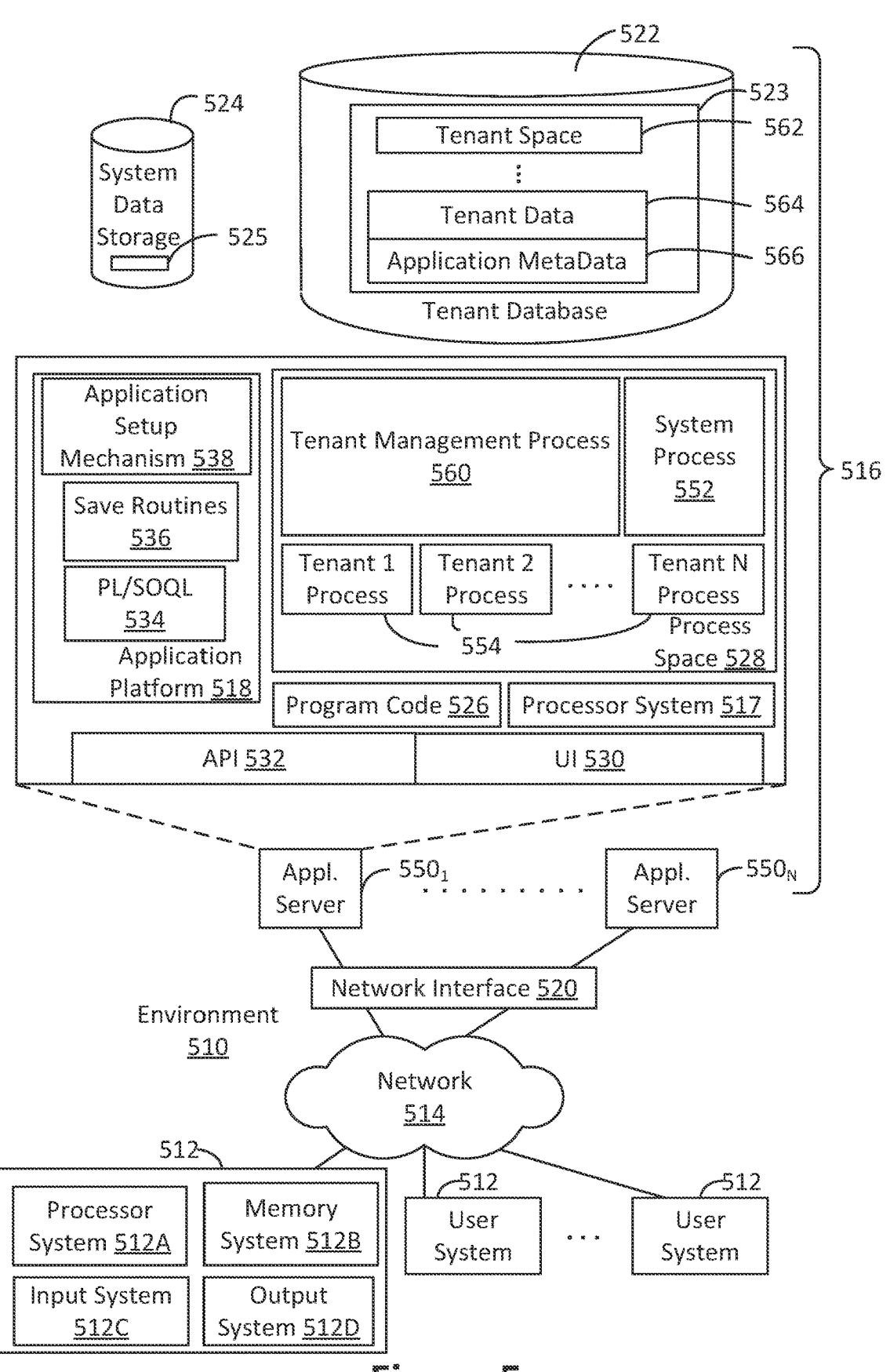
FIG. 5 shows a block diagram of an example of an environment that includes an on-demand database service configured in accordance with some implementations.

FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 518 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a web-based customer relations management and communication system. For example, in some implementations, system 516 may include application servers configured to implement and execute communication-related software applications. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as a social networking system and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 6A, 6B:
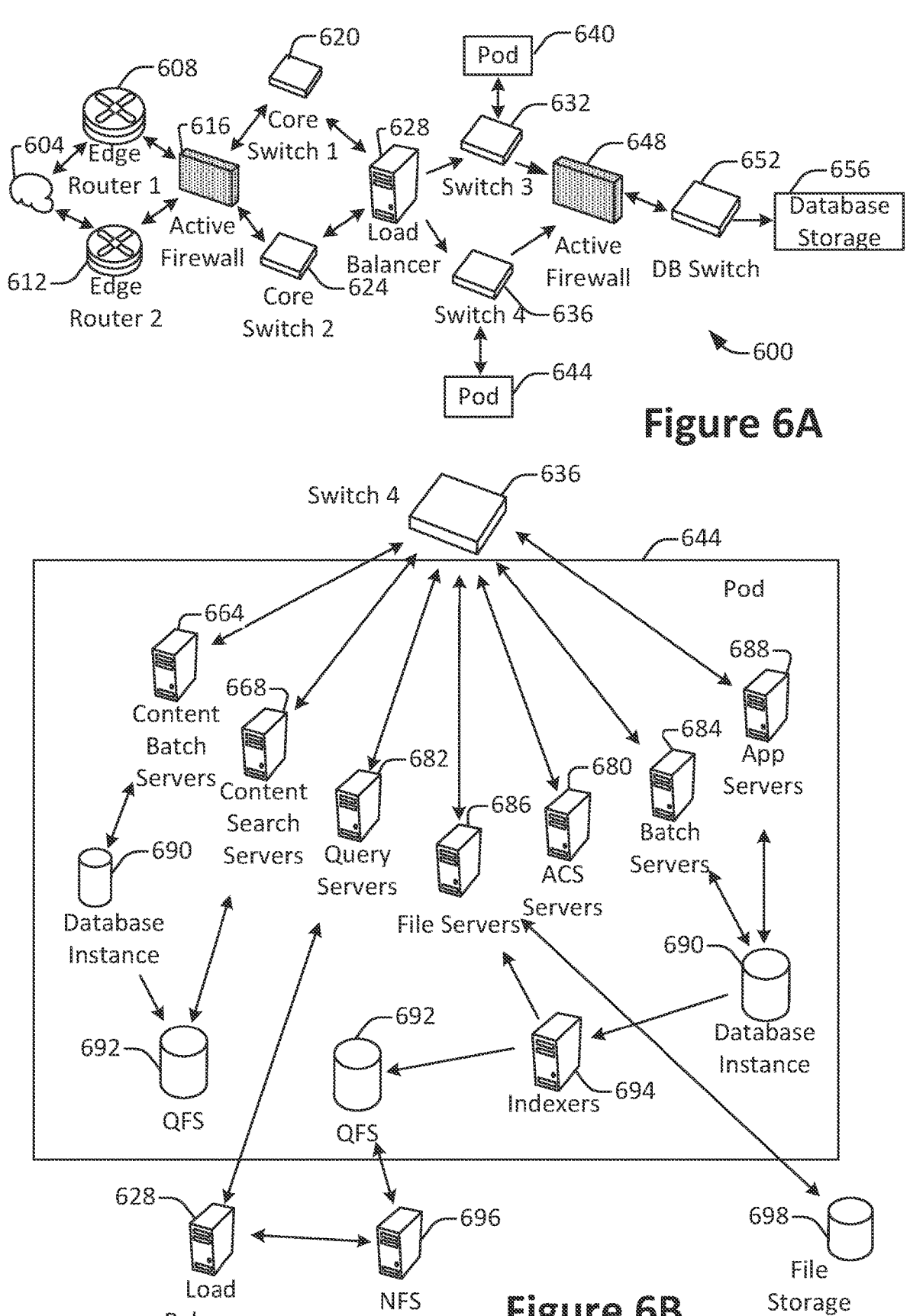
FIG. 6A shows a system diagram of an example of architectural components of an on-demand database service environment, configured in accordance with some implementations.
FIG. 6B shows a system diagram further illustrating an example of architectural components of an on-demand database service environment, in accordance with some implementations.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems ?12 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process contact and communication channel information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach.

Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBs), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
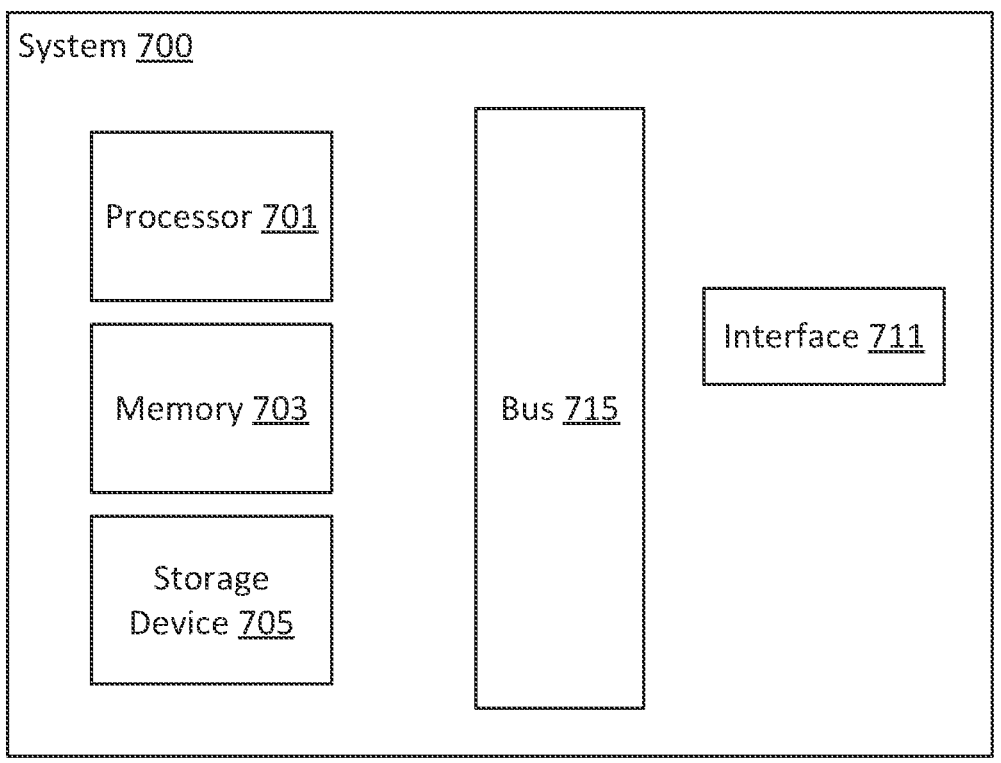
FIG. 7 illustrates one example of a computing device.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Custom Communication Package Creation and Installation

Figure 8:
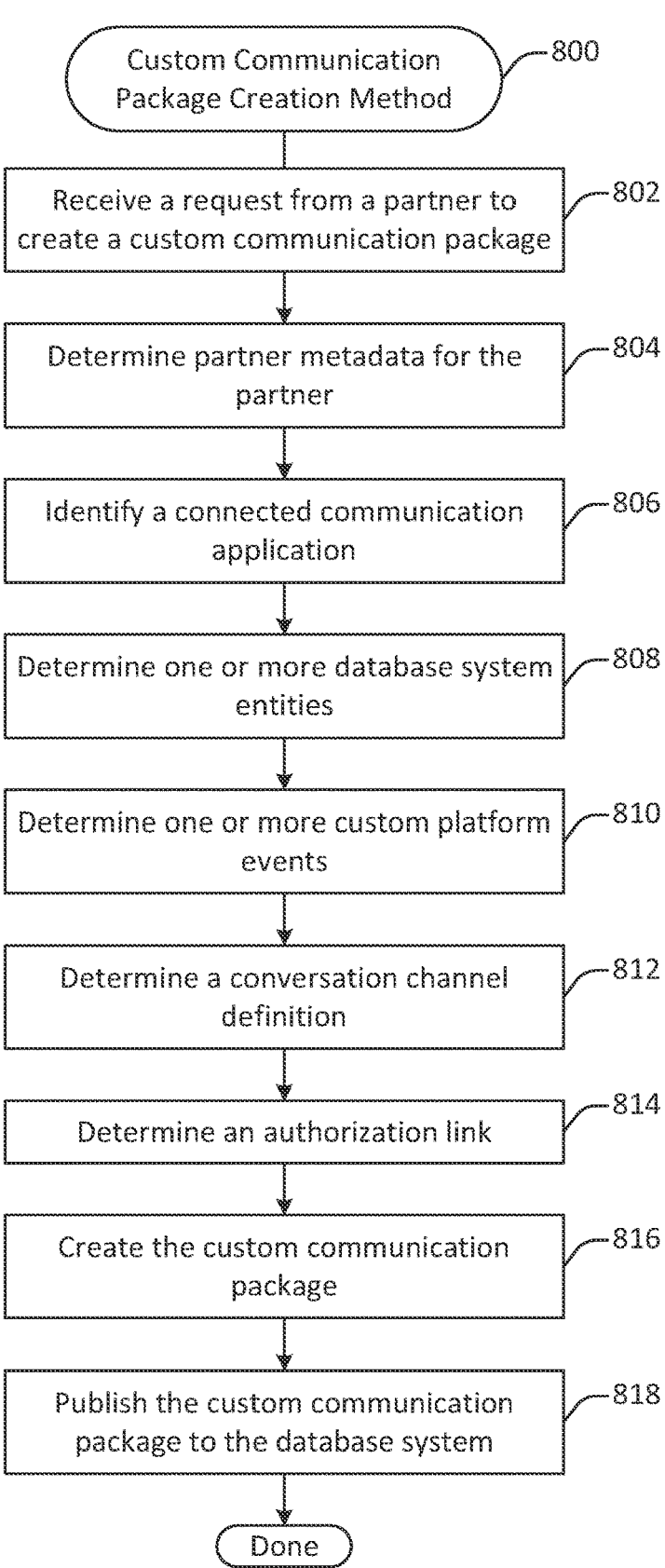
FIG. 8 illustrates a method of creating a custom communication package, performed in accordance with one or more embodiments.

FIG. 8 illustrates a method 800 of creating a custom communication package, performed in accordance with one or more embodiments. The method 800 may be performed at a computing services environment such as the computing services environment 202 shown in FIG. 2.

At 802, a request is received to create a communication channel. In some embodiments, the request may be generated based on user input provided via a user interface. For example, FIG. 9 illustrates a user interface 900 generated in accordance with one or more embodiments. The user interface 900 includes a contact creation window 902 in which user input indicating a request to create a new communication can be received. For example, a user creating a new communication channel can choose to create a new contact center entirely at 904 or can add the communication channel to an existing channel at 906.

Returning to FIG. 8, partner metadata for the partner is determined at 804. In some embodiments, the partner metadata may include information such as the partner name, partner type, and partner identifier.

A connected communication application is identified at 806. In some embodiments, the connected communication application may include one or more instructions for conducting communications via the communication channel. The connected communication application may also include configuration settings such as authentication information for authenticating communication with the connected application, policies such as application administrators, and access tokens for tenants to use when making requests to communicate via the connected application.

At 808, one or more database entities are determined. Examples of such database entities include one or more call center entities, contact center entities, and/or messaging channel entities. Such entities may be specific to the custom communication package and may facilitate the storage of information related to communication via the custom communication package.

One or more custom platform events are identified at 810. In some embodiments, a custom platform event may be a database entity definition for an event used to conduct communication via the third-party communication channel associated with the custom communication package. For instance, a custom platform event may include fields such as channel address identifier, payload, and recipient. Information such as a message to be transmitted may be stored in the payload, while the channel address identifier may uniquely identify the communication channel.

In some embodiments, the receipt of a message to be transmitted via the third-party communication channel associated with the custom communication package may trigger the creation of an event. As discussed with respect to FIG. 2, an event created in accordance with a platform event definition may be published via the event bus 224 and then transmitted to the appropriate communication channel through the subscribe service 222 and the partner system 206.

A conversation channel definition record is determined at 812. According to various embodiments, the conversation channel definition record may link information such as a custom platform event, the partner metadata, and the connected application. The conversation channel definition may be uniquely identified by a channel definition identifier. In this way, a custom communication package instance installed in a tenant space within the computing services environment may link to the custom communication package definition in the partner space.

An authorization link for the custom communication package is determined at 814. In some embodiments, the authorization link may be a unique identifier for authorizing communication by a tenant on a communication channel via the custom communication package. The authorization link may be determined in a manner that is specific to the computing services environment. For instance, the authorization link may combine an identifier for the partner with an identifier for the communication channel and/or the custom communication package.

The custom communication package is created at 816. In some embodiments, creating the custom communication package may involve operations such as determining a package name and selecting elements determined as discussed with respect to operations 804 through 812 for inclusion in the package. Such elements may then be combined into a custom communication package definition. An example of the custom communication package created at 814 is shown at 314 in FIG. 3. Creating the custom communication package may also involve creating in the database system one or more of the database entities determined at 808.

The custom communication package is published to the database system at 818. In some implementations, the custom communication package may be published to the web application user interface 230 shown in FIG. 2. Then, a tenant may install an instance of the custom communication package to the tenant's tenant space. Additional details regarding the installation of a custom communication package are discussed with respect to FIG. 10 and FIG. 11.

In some embodiments, some or all of the information identified and determined in the method 800 may be determined based on an interactive user interface. For instance, the computing services environment may provide a user interface such as the user interface 900 shown in FIG. 9 that guides a user to provide some or all of the information for creating the custom communication package.

In some embodiments, some or all of the information identified and determined in the method 800 may be determined based on predetermined configuration parameters. For instance, the partner may be associated with default metadata that is used when determining partner metadata for new custom communication packages created by the partner.

In some embodiments, some or all of the information identified and determined in the method 800 may be determined with the aid of a generative language model. For instance, a prompt template may include a natural language instruction instructing a generative language model to determine information such as a custom platform event, a conversation channel definition, and/or other information discussed with respect to the method 800. The prompt template may also include one or more fillable portions that may be filled based on user input. When the one or more fillable portions in the prompt template are filled, the resulting custom communication package creation prompt may be provided to a generative language model for completion. The prompt completion may include some or all of the elements of the custom communication package created at 814. The resulting custom communication package may then be provided to a user for review and refinement.

Figure 10:
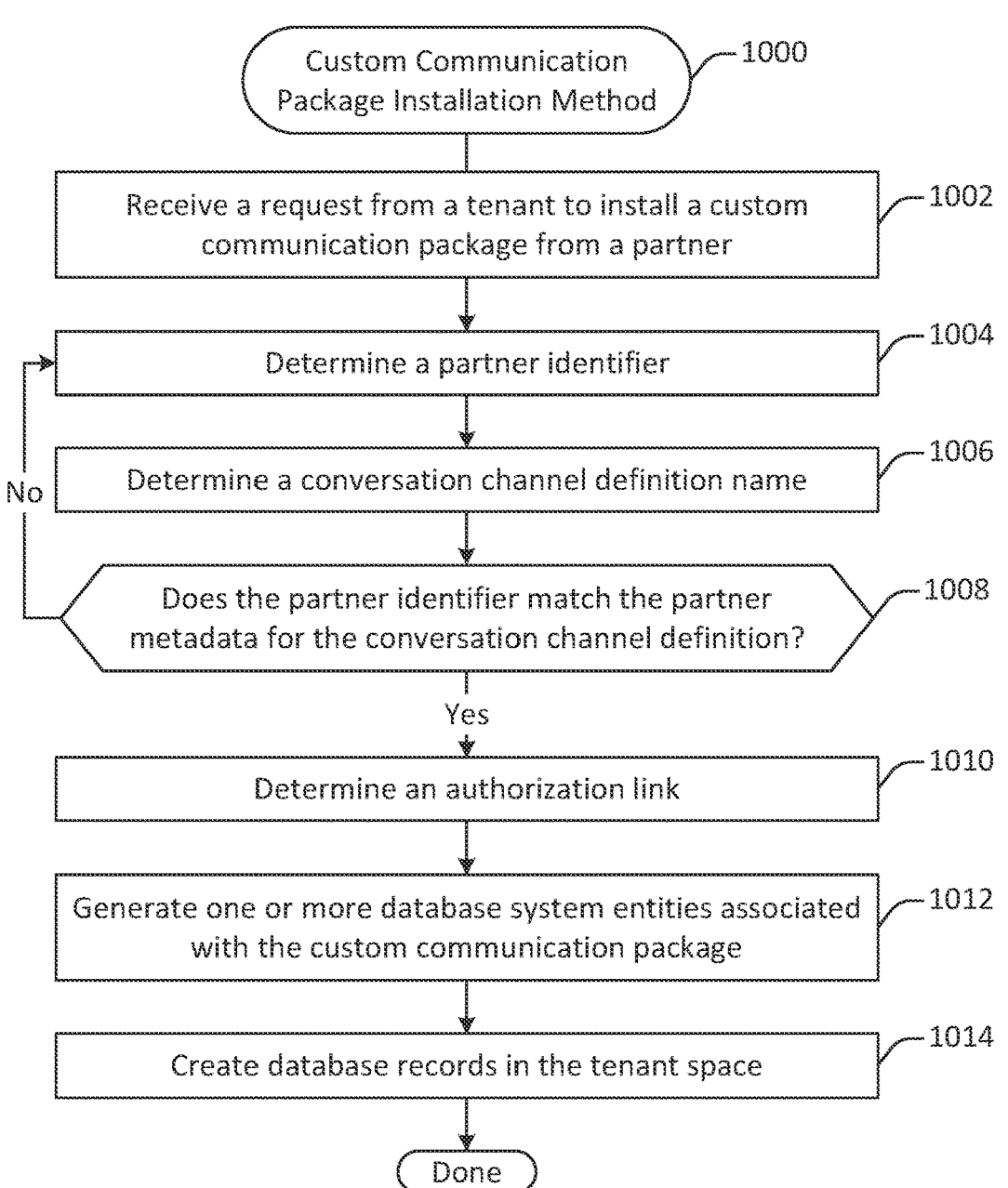
FIG. 10 illustrates a method for installing a custom communication package in a tenant space within a computing services environment.

FIG. 10 illustrates a method 1000 for installing a custom communication package in a tenant space within a computing services environment. According to various embodiments, the method 1000 may be performed at a computing services environment such as the computing services environment 202 shown in FIG. 2.

At 1002, a request to install a custom communication package from a partner is received from a tenant. The request may be generated based on an application procedure interface request, user input received via a graphical user interface, an instruction from a systems administrator, or via some other channel.

A partner identifier is determined at 1004, and a conversation channel definition name is determined at 1006. In some embodiments, the partner identifier may uniquely identifier the partner providing the custom communication package, while the conversation channel definition name may uniquely identifier the custom communication package itself. Such information may be included with the request received at 1002. Alternatively, or additionally, such information may be received later, for instance provided as user input via a graphical user interface.

A determination is made at 1008 as to whether the partner identifier matches the partner metadata for the conversation channel definition. In some embodiments, the determination may involve comparing the partner identifier determined at 1004 with the partner metadata 316 included within the custom communication package 314 identified by the conversation channel definition name determined at 1006.

Upon determining that the partner identifier matches the partner metadata for the conversation channel definition, at 1010 an authorization link is determined. In some embodiments, the authorization link may be a unique identifier for authorizing communication by a tenant on a communication channel via the custom communication package. The authorization link may be determined in a manner that is specific to the computing services environment. For instance, the authorization link may combine an identifier for the partner with an identifier for the communication channel and/or the custom communication package.

One or more database system entities associated with the custom communication package are generated at 1012. In some embodiments, the database system entities generated at 1012 may be similar to the database system entities generated at operation 808 shown in FIG. 8.

In some embodiments, the database system may include a dynamic schema database in which different rows in the same database table may store not only different database objects, but also different types of database objects. In such a configuration, generating the database system entities may involve creating one or more tenant-specific entries in a universal data dictionary specifying custom database object definitions.

Database records are created in the tenant space at 1014. In some embodiments, the database records may include various information used to operating the custom communication package. For instance, the database records may include the authorization link determined at 1010 and one or more database objects corresponding with the database system entities generated at 1012.

FIG. 11 illustrates another view of the tenant space 302, configured in accordance with one or more embodiments. The view presented in FIG. 3 illustrates one possible configuration of a tenant space with multiple custom communication channels.

In the example shown in FIG. 11, the tenant space 302 is configured with custom communication packages provided by partner A 1102 through partner K 1102. Each partner is associated with one or more conversation channel definition, including the conversation channel definition A1 1104 through the conversation channel definition An 1106 and the conversation channel definition K1 1124 through the conversation channel definition Kn 1126.

In the example shown in FIG. 11, a partner may be associated with a contact center proxy which acts as a proxy to a contact center provided by the vendor. For example, the partner A is associated with the contact center proxy A 1128, while the partner K is associated with the contact center proxy K 1128.

In the example shown in FIG. 11, a contact center proxy may include one or more communication channels. The communication channels may include custom channels corresponding with the conversation channel definitions and/or one or more standard communication channels. For example, the contact center proxy A 1108 includes the communication channels 1110, which includes one or more standard channels 1112 and the custom channel A1 1114 through the custom channel An 1116. As another example, the contact center proxy A 1128 includes the communication channels 1130, which includes one or more standard channels 1132 and the custom channel A1 1134 through the custom channel An 1136.

In the example shown in FIG. 11, a contact center proxy may also include contact center metadata, such as the metadata 1118 and the metadata 1138. Contact center metadata may include information such as connection settings (e.g., a connector URL, a connected application identifier, a custom login URL, etc.), information identifying one or more contact center users, one or more skills associated with the contact center, and/or one or more work queues associated with the contact center.

Communication Routing Via a Custom Communication Package

FIG. 12 illustrates an overview method 1200 for conducting a communication session via a custom communication package, performed in accordance with one or more embodiments. The method 1200 may be performed at a computing services environment such as the computing services environment 200 shown in FIG. 2.

At 1202, a communication session is established from an end point to a first database system tenant agent client machine by a database system partner through the database system. A first one or more messages are transmitted between the end point and the first database system tenant agent client machine via the communication session at 1204. In some embodiments, the end point may be an end user client machine. For instance, the end user may be a customer, service provider, vendor, or other contact of the database system tenant, and the agent may be tasked with communicating with the contact.

According to various embodiments, the communication session may be established and conducted in accordance with a custom communication package configured as discussed throughout the application. Additional details for establishing and conducting such a communication are discussed with respect to the method 1300 shown in FIG. 13.

At 1206, the communication session is optionally transferred to a second database system tenant agent client machine or other recipient. At 1208, a second one or more messages are transmitted between the end point and the second database system tenant agent client machine or other recipient via the communication session. In some embodiments, the communication session may be transferred if, for instance, the initial agent handling the session is unable to address the issues raised in the conversation. For example, the initial agent may specialize in customer service issues but may transfer the conversation if the end user would like to discuss issues related to account security or online access.

According to various embodiments, the communication session may be transferred to any of a variety of recipients. For example, the communication session may be transferred to an agent external to the tenant organization. As another example, the communication session may be transferred to an automated workflow, chatbot, or other service within the computing services environment. As yet another example, the communication session may be transferred to another agent within the same tenant organization. When transferring to an external agent, a list of external user IDs may be maintained. In such a situation, the communication session may be closed in the database system for the tenant that initially received the session. An example of a method for transferring a communication session and transmitting messages via the communication session is discussed with respect to the method 1400 shown in FIG. 14.

Figure 13:
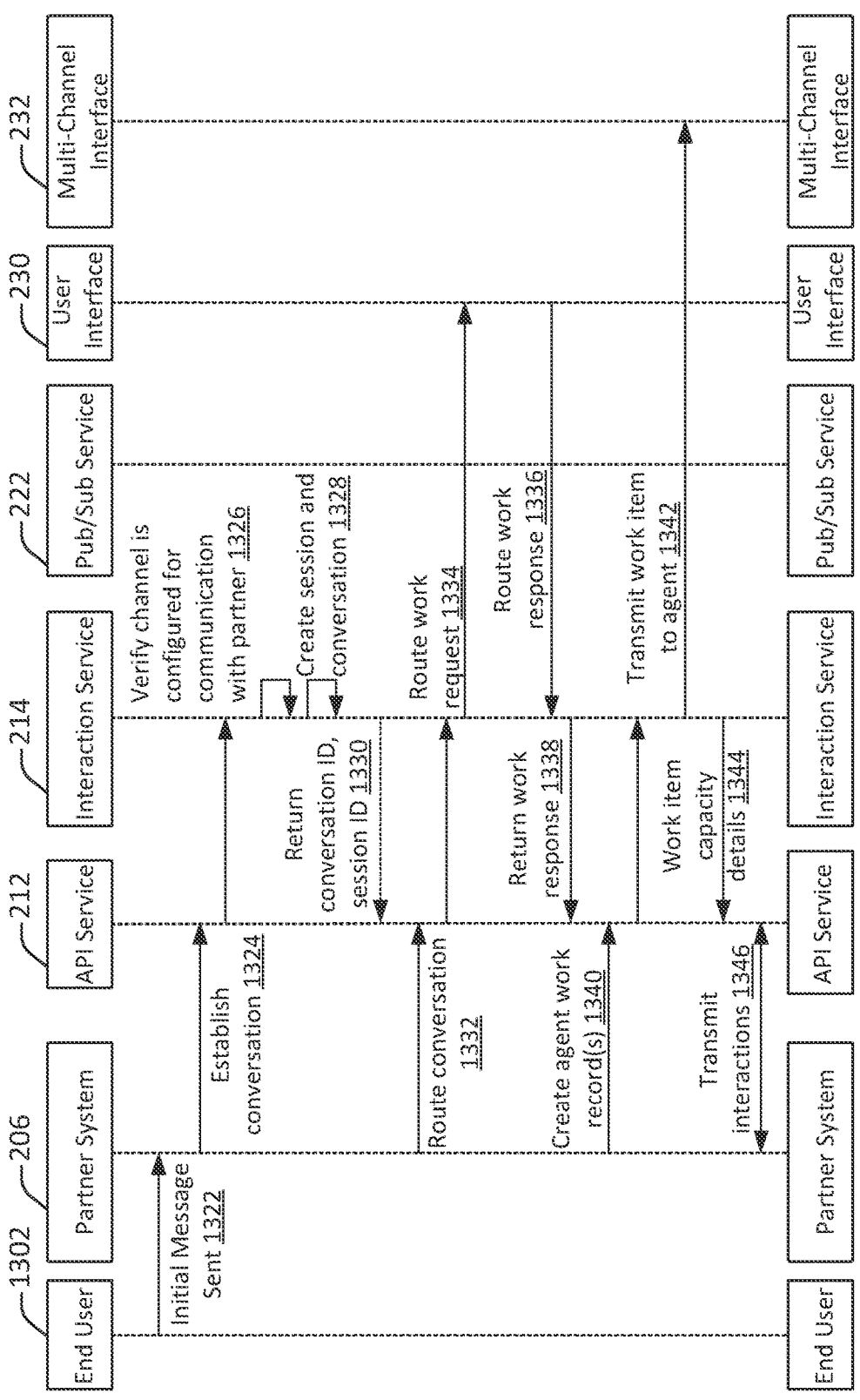
FIG. 13 illustrates a method for routing a communication from a client machine to an agent machine via a custom communication package, performed in accordance with one or more embodiments.

FIG. 13 illustrates a method 1300 for routing a communication from a client machine to an agent machine via a custom communication package, performed in accordance with one or more embodiments. The method 1300 may be performed at a computing services environment ecosystem such as the computing services environment ecosystem 200 shown in FIG. 2. The method 1300 includes communications between an end user machine 1302, the partner system 206, the API service 212, the interaction service 214, the publish/subscribe service 222, the agent client machine user interface 230, and the multi-channel user interface component 232.

The method 1300 illustrates one example of a method for routing a communication from a client machine to an agent, including examples of communications between various components of a computing services environment ecosystem 200 as well as examples of operations performed at those components. However, a method for routing a communication from a client machine to an agent may include operations other than those shown in FIG. 13. Similarly, a method for routing a communication from a client machine to an agent need not necessarily include all of the operations shown in FIG. 13.

An initial message or voice call is transmitted from the end user machine 1302 to the partner integration 206 at 1322. According to various embodiments, the end user device 1302 may be via any of a variety of devices, depending on the characteristics of the communication channel. For instance, the end user may communicate via a laptop computer, a desktop computer, a mobile phone, a table, or another type of device. The end user may communicate via an application specific to the communication channel (e.g., a messenger application). Alternatively, the end user may communicate via voice. Regardless of the particular communication channel employed, the partner system 206 may act as an endpoint, and then route the communication via the computing services environment on behalf of the end user.

The partner system establishes a conversation at 1324 by communicating with the API service 212 at the computing services environment 200. Establishing the conversation may involve transmitting an API request that includes information authenticating the partner system, identifying the end user, and/or identifying the tenant to which to route the communication.

At 1326, the API service 212 communicates with the interaction service 214 to verify that the communication channel through which the communication is being transmitted is configured with a custom communication package for the partner. This verification may involve, for instance, determining whether the partner has published a custom communication package for the channel that is registered with the interaction service.

In some embodiments, the system may also confirm that consent has been established for the conversation. Since the end user initiated the conversation, the partner may call a consent API and set the appropriate consent status.

The communication conversation and session is created at 1328. The communication session may be a communication link between the end user and the computing services environment. The communication conversation may include one or more database records representing the conversation.

In some embodiments, the conversation and the session may each be associated with a respective unique identifier in the computing services environment. These identifiers may be returned to the partner system via the API service at 1330.

The conversation is routed to an agent at 1332. According to various embodiments, routing the conversation to an agent may involve identifying a suitable agent for handling the communication and communicating with that agent's client machine to transfer the communication session to that client machine. Depending on the configuration of the system, any of various techniques may be used to route communications. Such techniques may include standard routing protocols provided by the computing services environment and/or custom routing protocols provided by a partner. Some examples of techniques related to conversation routing are discussed with respect to the methods 1700 and 1800 shown in FIG. 17 FIG. 18.

At 1334, a work request message is sent to the user interface 230 at the client machine of the agent to which the work is to be routed. The agent may then send a response to the request. For instance, the agent may accept or reject the request to handle the conversation. The agent's response may be transmitted back to the interaction service 214 at 1336.

The agent's response is routed to the partner system 206 via the API service 212 at 1338. If the route work request is rejected, then operations 1332-1338 may be performed again to select a different agent. Alternatively, if the route work request is accepted, then the agent work record is created at 1340. Creating the agent work record may involve storing one or more database records associating the agent with the conversation ID and/or the session ID.

The work item is transmitted to the agent at 1342 from the interaction service 214. In some embodiments, transmitting the work item to the agent may involve, for example, sending information to the agent's client machine allowing the client machine to join the conversation and the communication session. For instance, the agent's client machine may be sent information such as the session ID and the conversation ID.

The interaction service may send information about work item capacity to the API service 212 at 1344. The work capacity information may identify, for instance, an amount of work assigned to an agent and/or an availability of an agent to be assigned additional work. Such information may then be accessed by the partner system, for instance to facilitate routing.

Communications between the end user and the agent are then transmitted via the partner system 206 and the API service 212 at 1346. Additional details regarding such communications are discussed with respect to FIG. 19 and other sections of the application.

Figure 14:
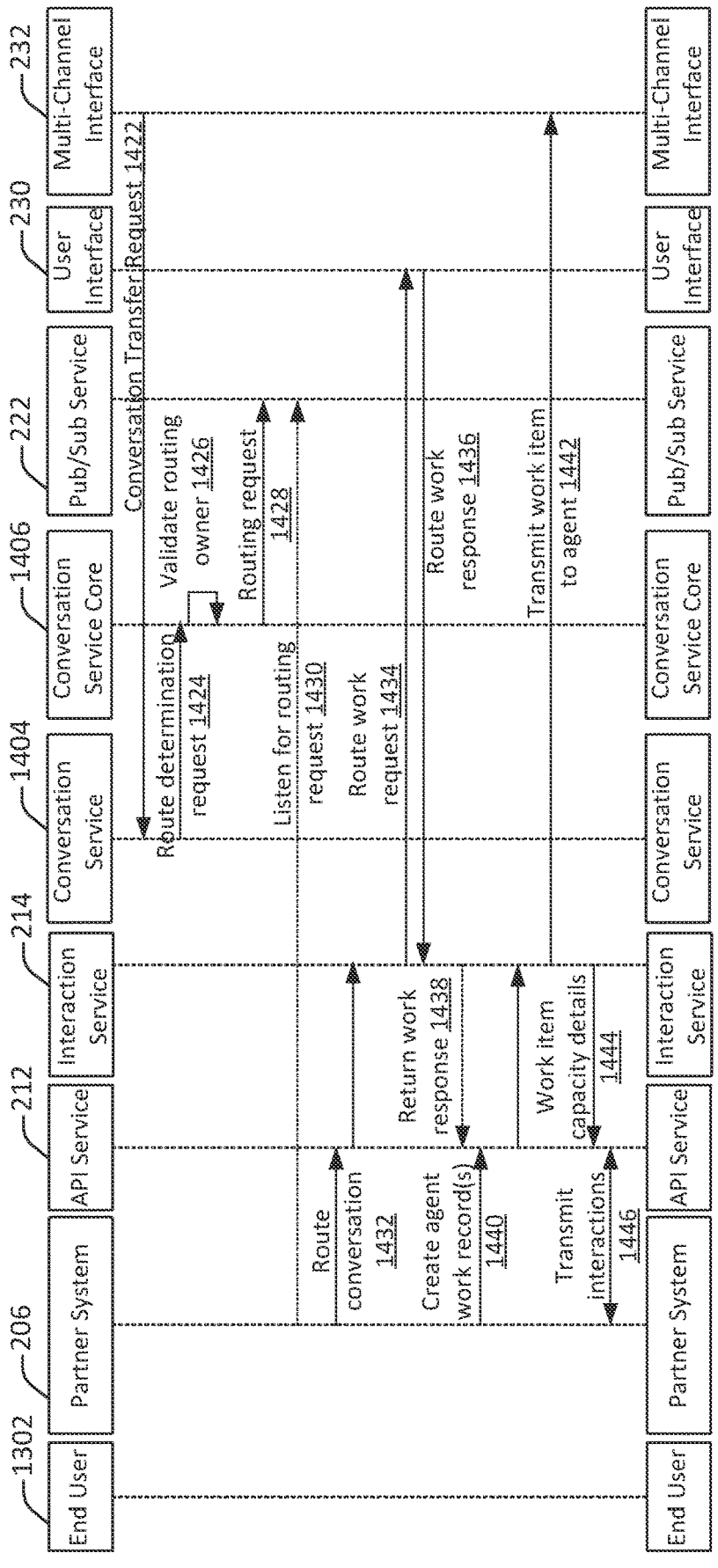
FIG. 14 illustrates a method for transferring a conversation conducted via a custom communication package from a first agent to a second agent, performed in accordance with one or more embodiments.

FIG. 14 illustrates a method 1400 for transferring a conversation conducted via a custom communication package from a first agent to a second agent, performed in accordance with one or more embodiments. The method 1400 may be performed at a computing services environment ecosystem such as the computing services environment ecosystem 200 shown in FIG. 2. The method 1400 includes communications between an end user machine 1302, the partner system 206, the API service 212, the interaction service 214, a conversation service 1404, a conversation service core 1406 the publish/subscribe service 222, the agent client machine user interface 230, and the multi-channel user interface component 232. The conversation service 1404 and the conversation service core 1406 may be components within the conversation platform 216.

A conversation transfer request is sent at 1422 from the multi-channel interface 232 to the conversation service 1404. In some embodiments, the conversation transfer request may be generated based on user input provided by the agent. For instance, the agent initially handling the conversation may indicate that the conversation should be transferred to a different agent. Such a request may be generated if, for example, the first agent becomes too busy or determines that he/she is ill equipped to handle the conversation. The conversation transfer request may include routing information to allow the system to route the conversation to an agent equipped to handle it.

A route determination request is sent from the conversation service 1404 at 1424. The conversation service core 1406 validates that the partner associated with the custom communication package is set as the routing owner at 1426. The conversation service core then sends a routing request to the partner via the publish/subscribe service 222 at 1428. The partner listens for such a routing request at 1430.

Upon detecting a routing request, the partner provides a route for routing the conversation to an agent at 1432. According to various embodiments, routing the conversation to an agent may involve identifying a suitable agent for handling the communication and communicating with that agent's client machine to transfer the communication session to that client machine. Depending on the configuration of the system, any of various techniques may be used to route communications. Such techniques may include standard routing protocols provided by the computing services environment and/or custom routing protocols provided by a partner. Some examples of techniques related to conversation routing are discussed with respect to the methods 1700 and 1800 shown in FIG. 17 FIG. 18.

At 1434, a work request message is sent to the user interface 230 at the client machine of the agent to which the work is to be routed. The agent may then send a response to the request. For instance, the agent may accept or reject the request to handle the conversation. The agent's response may be transmitted back to the interaction service 214 at 1436.

The agent's response is routed to the partner system 206 via the API service 212 at 1438. If the route work request is rejected, then operations 1432-1438 may be performed again to select a different agent. Alternatively, if the route work request is accepted, then the agent work record is created at 1340. Creating the agent work record may involve storing one or more database records associating the agent with the conversation ID and/or the session ID.

The work item is transmitted to the agent at 1442 from the interaction service 214. In some embodiments, transmitting the work item to the agent may involve, for example, sending information to the agent's client machine allowing the client machine to join the conversation and the communication session. For instance, the agent's client machine may be sent information such as the session ID and the conversation ID.

The interaction service may send information about work item capacity to the API service at 212. The work capacity information may identify, for instance, an amount of work assigned to an agent and/or an availability of an agent to be assigned additional work. Such information may then be accessed by the partner system, for instance to facilitate routing.

Interactions between the end user and the agent are then transmitted via the partner system 206 and the API service 212 at 1446. Additional details regarding such interactions are discussed with respect to FIG. 19 and other sections of the application.

Figure 15:
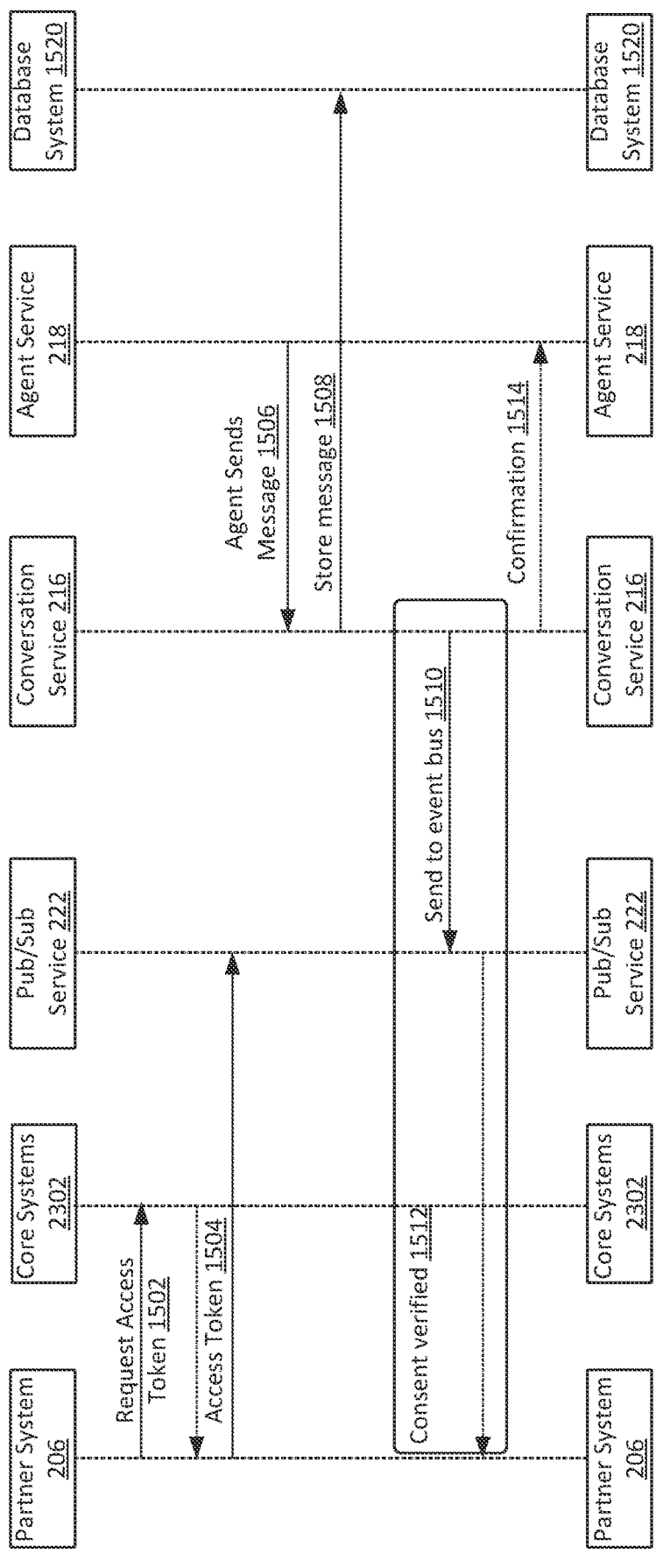
FIG. 15 illustrates a method for conducting outbound communication between a tenant agent and an end user, performed in accordance with one or more embodiments.

FIG. 15 illustrates a method 1500 for conducting outbound communication between a tenant agent and an end user, performed in accordance with one or more embodiments. The method 1500 may be conducted at a computing services environment such as the computing services environment 202 shown in FIG. 2.

An access token is requested at 1502. In some embodiments, the access token may be an Oauth 2 token. The access token is sent to the partner system 206 and then to the publish/subscribe service 222 at 1504. The access token may then be used to send messages to the end point from the agent.

At 1506, the agent sends a message. The message is stored to the database system 1520 at 1508, and may be sent to any internal recipients. The message is sent to the publish/subscribe service 222 at 1510, where it may be received by the partner system 206 and transmitted to the end point via the communication channel. The operations shown at 1512 may be restricted based on communication permissions. For instance, the conversation platform 216 may request permission before publishing the message to the publish/subscribe service 222. Once the message is posted, a notification may be sent to the agent services engine 218 at 1514.

In some embodiments, some operations shown in FIG. 13-15 may be performed each time a message is sent, while other operations may be performed only when needed. For instance, in FIG. 15, an access token may be requested and granted when a conversation is first initialized, and then need only be requested again if the initial access token is no longer valid, for example if it expires.

Figures 16A, 16B:
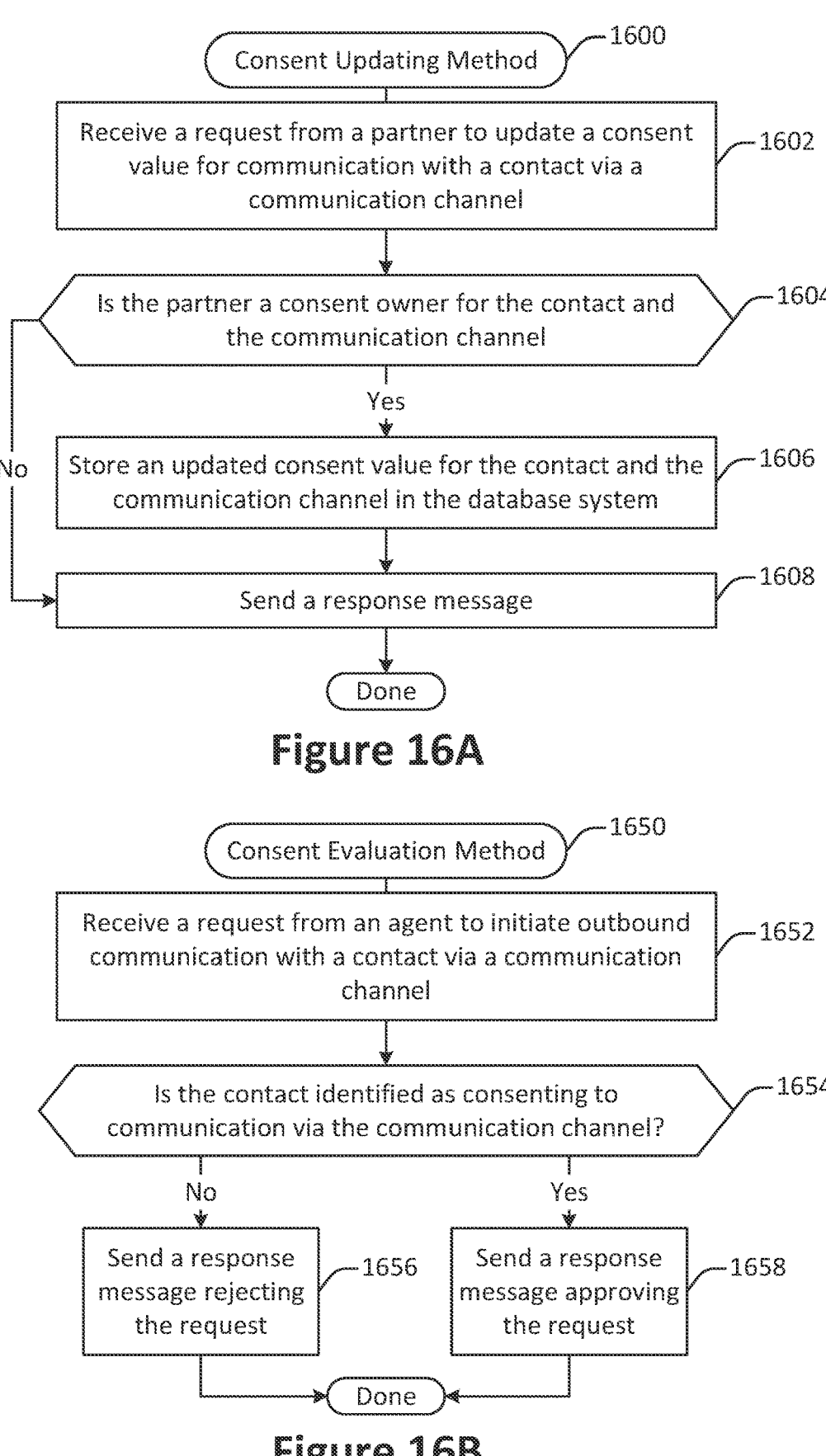
FIG. 16A illustrates a method for updating consent information for a contact stored in the database system, performed in accordance with one or more embodiments.
FIG. 16B illustrates a method for evaluating a consent request for a contact stored in the database system, performed in accordance with one or more embodiments.

FIG. 16A illustrates a method 1600 for updating consent information for a contact stored in the database system, performed in accordance with one or more embodiments. The method 1600 may be performed at a computing services environment computing services environment 202 shown in FIG. 2.

At 1602, a request is received from a partner to update a consent value for communication with a contact via a communication channel. In some embodiments, the request may be received via a consent API. By default, contacts may be identified as either consenting or not consenting to communication via a communication channel, depending on one or more configuration parameters. The request received at 1602 may include a new consent value (e.g., true or false) indicating a change in whether the contact has consented to communication with the tenant via the communication channel associated with a custom communication package.

At 1604, a determination is made as to whether the partner is a consent owner for the contact and the communication channel. In some embodiments, the database system may store a value indicating an entity (e.g., an account) is authorized to change a consent value for a contact. In the case of a custom communication package, the partner responsible for the custom communication package used to facilitate communication between a contact and a tenant via a communication channel may be identified as authorized to change the consent value for that contact. For instance, the partner may send a message via the communication channel requesting consent to initiate communicate with the contact, and then may send a request to the database system to update the consent value reflecting the permission (or lack thereof).

Upon determining that the partner is the consent owner for the combination of the tenant, the tenant contact, and the communication channel, an updated consent value for the contact and the communication channel is stored in the database system at 1606. A response message indicating the success or failure of the request is sent at 1608.

FIG. 16B illustrates a method 1650 for evaluating a consent request for a contact stored in the database system, performed in accordance with one or more embodiments. The method 1650 may be performed at a computing services environment computing services environment 202 shown in FIG. 2.

At 1652, a request to initiate outbound communication with a contact via a communication channel is received from an agent. In some embodiments, the request may be received via a consent API. The request may be generated by, for instance, one or more elements within the computing services environment 202, such as the conversation platform 216.

A determination is made at 1654 as to whether the contact is identified in the database as consenting to communication from the tenant via the communication channel. The determination may be made by accessing the information stored as discussed with respect to operation 1606.

Upon determining that the contact has consented to the communication, a response message approving the request is sent at 1658. Upon determining instead that the contact has not consented to the communication, a response message rejecting the request is sent at 1656.

FIG. 17 illustrates a method 1700 for tuning a generative language model for routing communication sessions conducted via a custom communication package, performed in accordance with one or more embodiments. In some embodiments, the method 1700 may be performed at a computing services environment such as the 202 shown in FIG. 2. The generative language model tuned as discussed with respect to the method 1700 may be used to determine a route for a communication session, a process which is discussed with respect to the method 1800 shown in FIG. 18.

A request to tune a generative language model to determine a communication route for a communication session is received at 1702. In some embodiments, the request may be generated at scheduled times, based on a triggering condition, or when manually requested (e.g., by a systems administrator). For example, the generative language model may be trained when the system is initialized. As another example, the generative language model may be trained periodically, for instance when new training data is made available.

A prompt template for determining a communication route is identified at 1704. In some embodiments, a prompt template may include natural language instructions for determining a communication route. For instance, a prompt template may include instructions such as "You are tasked with identifying a customer service agent from the following list of agents to handle a customer interaction. Please identify the customer service agent best suited to handle the customer interaction may matching the skills and experience of the customer service agent with the needs of the customer as described in the customer interaction summary provided below."

In some embodiments, a prompt template may also include one or more fillable portions. A fillable portion may be used to add information to the prompt template to create an input prompt, which then may be completed by the generative language model. For example, one fillable portion (e.g., "<customer interaction summary>") may be filled with a description of the communication session to allow the generative language model to better route the communication session to the correct customer service agent. As another example, another fillable portion (e.g., "<available agents and their characteristics>") may be filled with a list of available agents and any characteristics that could be used to match the communication session with one of the agents.

A set of training communication sessions is identified at 1706. Sets of one or more input characteristics and actual routes for the training communication sessions are identified at 1708. In some embodiments, the information identified at

1706 and 1708 may be retrieved from the database system, for instance from the conversation storage repository 220 shown in FIG. 2.

In some embodiments, the training communication sessions may be records of previous communication sessions handled by the system. Actual routes for the training communication sessions may include information such as the agents to whom the training communication sessions were actually routed. In practice, the actual route may have been determined by a human, by a previous version of the generative language model, by a different routing process, or a combination thereof.

In some embodiments, input characteristics for a training communication session may include information such as a summary of the issues to be addressed in the communication session. For instance, in the customer relations management context, a training communication session may include text such as "I have a question about a product that I purchased from Acme", where Acme is a tenant of the computing services environment. Alternatively, or additionally, a training communication session may include metadata such as an account identifier associated with the end user, demographic information associated with the end user, interaction history information associated with the end user, and the like.

In some embodiments, output characteristics for a training session may include information such as agent feedback, issue resolution, and the like. For instance, in the customer relations management context, a training communication session may be associated with feedback such as "The agent successfully resolved my concern" or "The agent was unable to answer my question." Such information may be used to better tune the generative language model to propose routes that match or not match the actual routes the routes in the training data.

At 1710, a set of training prompts is determined based on the prompt templates and the sets of one or more input characteristics of the communication sessions. In some embodiments, the a training prompt may be determined by filling one or more fillable portions in the prompt template with information identified as discussed with respect to operations 1706 and 1708. For instance, the generative language model may be tasked with determining a route for a communication session using the same information available when the communication session was actually routed.

A set of prompt completions is determined at 1712 based on the prompt and a tuned generative language model. In some embodiments, the prompt completions may be determined by providing the training prompt to a generative language model. For instance, the training prompts may be provided to a generative language model such as GPT3 or Google Bard. The generative language model may be located within the computing services environment or in a remote computing system.

A set of proposed communication routes is determined at 1714 based on the prompt completions. In some embodiments, the proposed communication routes may be determined by extracting the novel text from the prompt completions. For example, the novel text may identify, for a given communication session, an agent to which to route the communication session. As another example, the novel text may identify, for a given communication session, a classification of agent to which to route the communication session. For instance, the classification may identify a set of characteristics or skills associated with the agent to which to route the communication session.

A tuning layer for the generative language model is updated at 1716 based on a comparison of the proposed communication routes and the actual communication routes. In some embodiments, updating the tuning layer may involve updating one or more weights or parameter values associated with inputs or outputs to provide to the generative language model. By updating the tuning layer in this way, the generative language model may be adapted to the particular task of route determination.

At 1718, a determination is made as to whether to continue tuning the generative language model. In some embodiments, the determination may be made based at least in part on the comparison determined at 1716. For instance, a loss function may indicate a degree to which the tuned generative language model produced proposed communication routes that deviate from the actual communication routes in the training data. The loss function may take into account feedback information, for example penalizing the generative language model for routing a communication session to an agent in a way that matches the actual route when the agent was unsuccessful in handling the communications ession. Based on the loss function, the generative language model may continue to be tuned while the loss value produced by the loss function exceeds a designated threshold.

Upon determining to continue tuning the generative language model, a new set of training prompts is determined at 1710. The new training prompts may be identical to previous training prompts or may be different in some way, for instance including different natural language instructions.

Upon determining instead not to continue tuning the generative language model, the tuning layer is stored at 1720. In some embodiments, the tuning layer may be stored in a storage system within the computing services environment so that it may be used to facilitate route determination as discussed with respect to the method 1800 shown in FIG. 18.

FIG. 18 illustrates a method 1800 for determining a route for a communication session conducted in accordance with a custom communication package, performed in accordance with one or more embodiments. The method 1800 may be performed at a computing services environment such as the computing services environment 200 shown in FIG. 2. The method 1800 may be used to apply a generative language model tuned as discussed with respect to the method 1700 shown in FIG. 7 to determine a route for a communication session.

At 1802, a request to determine a communication route for a communication session between an end point and a computing services environment tenant is received. In some embodiments, the request may be received at a partner computing system. Alternatively, the request may be received at the database system, which may execute processes on behalf of the partner. For instance, an example of the receipt and execution of such a request is discussed with respect to operations 1332-1338 in FIG. 13, and operations 1423-1438 in FIG. 14.

According to various embodiments, the end point may be a remote computing device. The remote computing device may be associated with and/or authenticated to an account included in the contact information represented in the database records stored in the database system. For instance, the account may be a customer, vendor, or other contact associated with the computing services environment tenant.

A prompt template for determining a communication route is identified at 1804. In some embodiments, the prompt template identified at 1804 may be similar or identical to the prompt template identified at operation 1704 shown in FIG. 17.

One or more characteristics of the communication session are identified at 1806. In some embodiments, the communication session characteristics may be similar to the characteristics discussed with respect to the operation 1708 shown in FIG. 17. For instance, the communication session characteristics may include an identity of the tenant, an identifier associated with a computing services environment account to which the end point is authenticated, and/or descriptive information characterizing the communication session.

According to various embodiments, the descriptive information may include natural language describing, for instance, an issue to which the communication session pertains. For example, the descriptive information may identify a product or service provided by the vendor. As another example, the descriptive information may identify a goal associated with the communication session, such as technical support, a product return, a purchase, or the like.

An input prompt is determined at 1808 based on the prompt template and the one or more characteristics of the communication session. In some embodiments, the input prompt template may be determined in a manner similar to the prompt completions determined at operation 1712 shown in FIG. 17. That is, determining the input prompt completion may involve filling one or more fillable portions of the prompt template with some or all of the communication session characteristics determined at 1808. In this way, the input prompt may also include the natural language instructions included in the prompt template.

A prompt completion is determined at 1810 based on the input prompt and a tuned generative language model. In some embodiments, the generative language model may be tuned as discussed with respect to the method 1700 shown in FIG. 17. The prompt completion may be determined in a manner similar to that discussed with respect to operation 1714.

At 1812, a communication route including an agent of the computing services environment tenant is determined based at least in part on the prompt completion. According to various embodiments, the prompt completion may include novel text generated by the generative language model. For instance, the prompt completion may include text that identifies one or more agent to which the communication session may be routed.

In some embodiments, determining the communication route may involve checking for agent capacity, potentially across multiple routing engines. For instance, an agent may handle communication sessions created both as discussed with respect to the method 1800 and also via one or more other routing engines. For example, the agent may communicate with end users via different communication channels associated with different custom communication packages, some or all of which may be associated with different routing engines. As another example, the computing services environment may employ one or more default routing engines to route some types of communication sessions. Accordingly, the agent services engine 218 may determine multi-route capacity information for the agent or agents before selecting an agent for routing. For instance, the generative language model may identify multiple agents who may handle a communication session, and the system may select one of the identified agents based on overall multi-channel capacity.

A work request identifying the communication session is transmitted to the agent's client machine at 1814. In some embodiments, the work request may be transmitted via the agent services engine 218 and/or the agent client machine interface 226 shown in FIG. 2.

A determination is made at 1814 as to whether the work request is accepted. In some implementations, the agent may provide user input via a user interface indicating a desire to accept or reject the request. The agent's response may then be routed back to the computing services environment via the agent client machine interface 226.

At 1816, feedback information for the communication route is optionally determined. The feedback information may include any indication by the tenant, the end user, or the agent as to the suitability of the routing determination. For example, the end user may indicate whether or not the communication session was helpful. As another example, the tenant may indicate whether the issue discussed in the communication session was resolved. As yet another example, the agent may indicate whether he or she possessed the skills and experience to address the issues discussed in the communication session.

User Interface Architecture

FIG. 19 illustrates a custom communication package user interface overview method 1900, performed in accordance with one or more embodiments. The method 1900 may be performed at a computing services environment such as the computing services environment ecosystem 200 shown in FIG. 2.

At 1900, a conversation and messaging session is created with an end point via a custom communication package based on a request from a computing services environment partner. In some embodiments, the request may be generated based on communication from an end point, which may be a remote computing system associated with an account within the computing services environment. For instance, the session may be created as discussed with respect to the operations 1322 and 1324 shown in FIG. 13.

A user interface interpreter flow for the messaging channel is executed at 1904 for the messaging session. Additional details regarding the execution of such a flow are discussed with respect to FIG. 23.

An agent work item is created at 1906 based on an agent selection received from the computing services environment partner. In some embodiments, the creation of an agent work item may involve the generation of one or more database records representing the linkage of the conversation and messaging session (i.e., the communications session) and the agent.

According to various embodiments, any of various techniques may be used to determine the agent selection. For example, the agent selection may be determined as discussed with respect to FIG. 17 and FIG. 18. As another example, the agent selection may be determined in some other way, for instance via a standard routing protocol provided by the computing services environment.

The agent work is transmitted to the multi-channel user interface at 1908. For instance, the agent work may be transmitted to the multi-channel interface 232 shown in FIG. 2 via the agent client machine interface 226. The work request may identify the communication session as well as any suitable information characterizing the communication session. For instance, the work request may identify the end user and/or a description of the issues involved in the communication session.

One or more agent life cycle events are published at 1910. For instance, an agent life cycle event may be published to the publish/subscribe service 222 via the event bus 224. The agent life cycle event may identify information such as when the work request has been sent to the agent, shown to the agent, accepted by the agent, declined by the agent, and/or other relevant lifecycle events.

A determination is made at 1912 as to whether the work is accepted. The determination may be made by accessing the agent life cycle events, for instance via the publish/subscribe service 222. Upon determining that the work request was rejected, a new agent work item is created at 1906 assigning the session to a different agent. Upon determining instead that the work request was accepted, the computing services environment may facilitate communication between the agent and the end point.

Figure 20:
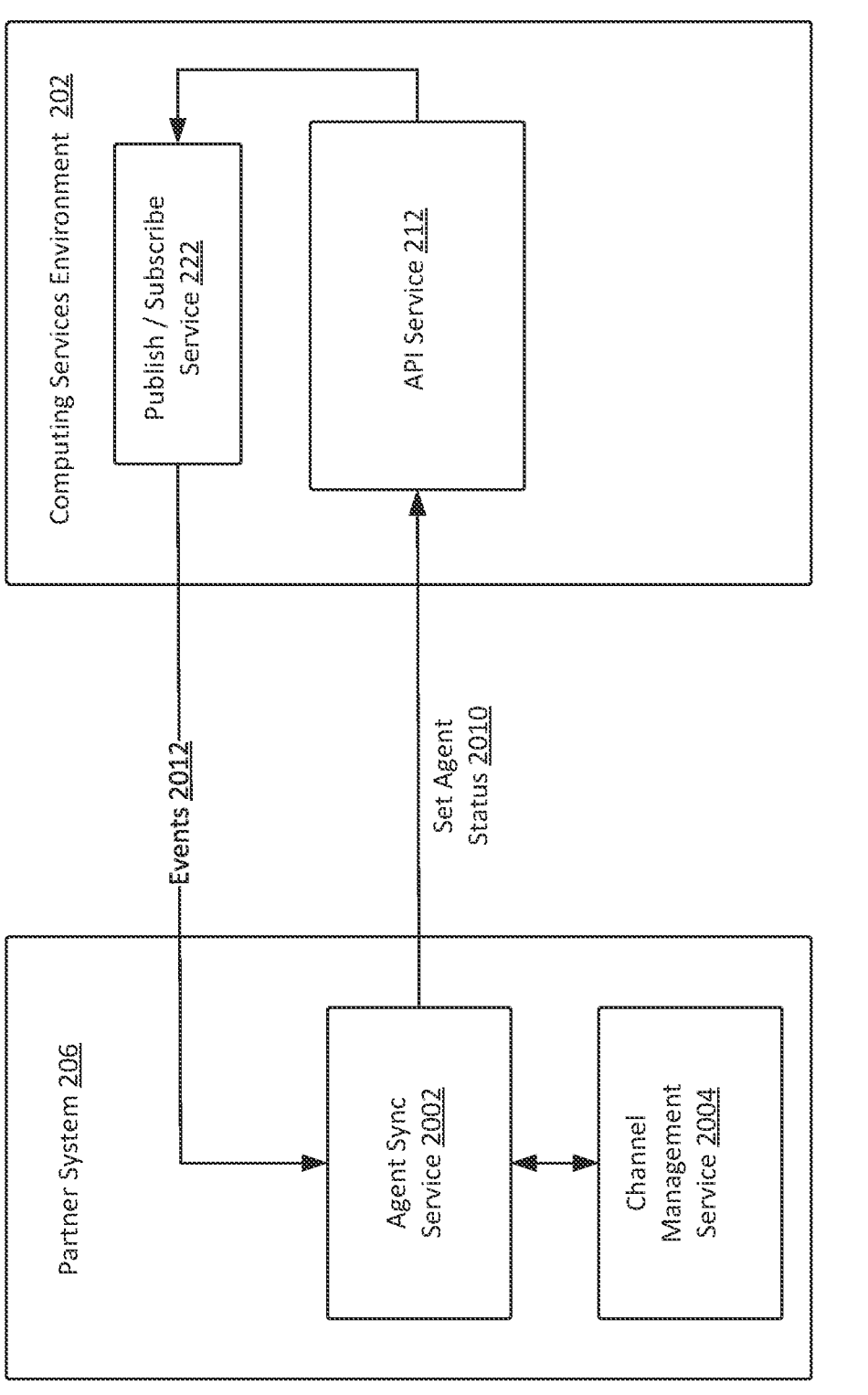
FIG. 20 illustrates a message passing diagram that provides additional details regarding the updating of agent-related information between the partner system and the computing services environment, configured in accordance with one or more embodiments.

FIG. 20 illustrates a message passing diagram that provides additional details regarding the updating of agent-related information between the partner system 206 and the computing services environment 202, configured in accordance with one or more embodiments.

In FIG. 20, the partner system 206 includes an agent sync service 2002 and a channel management service 2004. According to various embodiments, the agent sync service 2002 performs actions such as receiving event information from the computing services environment 202 and transmitting agent status information to the computing services environment 202.

In some embodiments, the agent status information 2010 includes data such as work assigned to an agent by the partner system via a communication channel governed by a custom communication package. The channel management service 2004 performs operations such as determining proposed routes based at least in part on the agent status information.

According to various embodiments, the events 2012 include information used to perform routing and other operations. For example, the events 2012 may identify work items assigned to particular agents. As another example, the events 2012 may include capacity information for agents. The capacity information may identify, for instance, an availability of an agent to handle an additional communication session. Availability may be measured in a difference between a maximum and current number of work items assigned to the agent, an estimated time remaining before an agent could handle a new work item, or other indicators of capacity. As another example, the events 2012 may identify agent status. For instance, an agent status may indicate whether the agent is active, busy, or accepting new work items.

Figure 21:
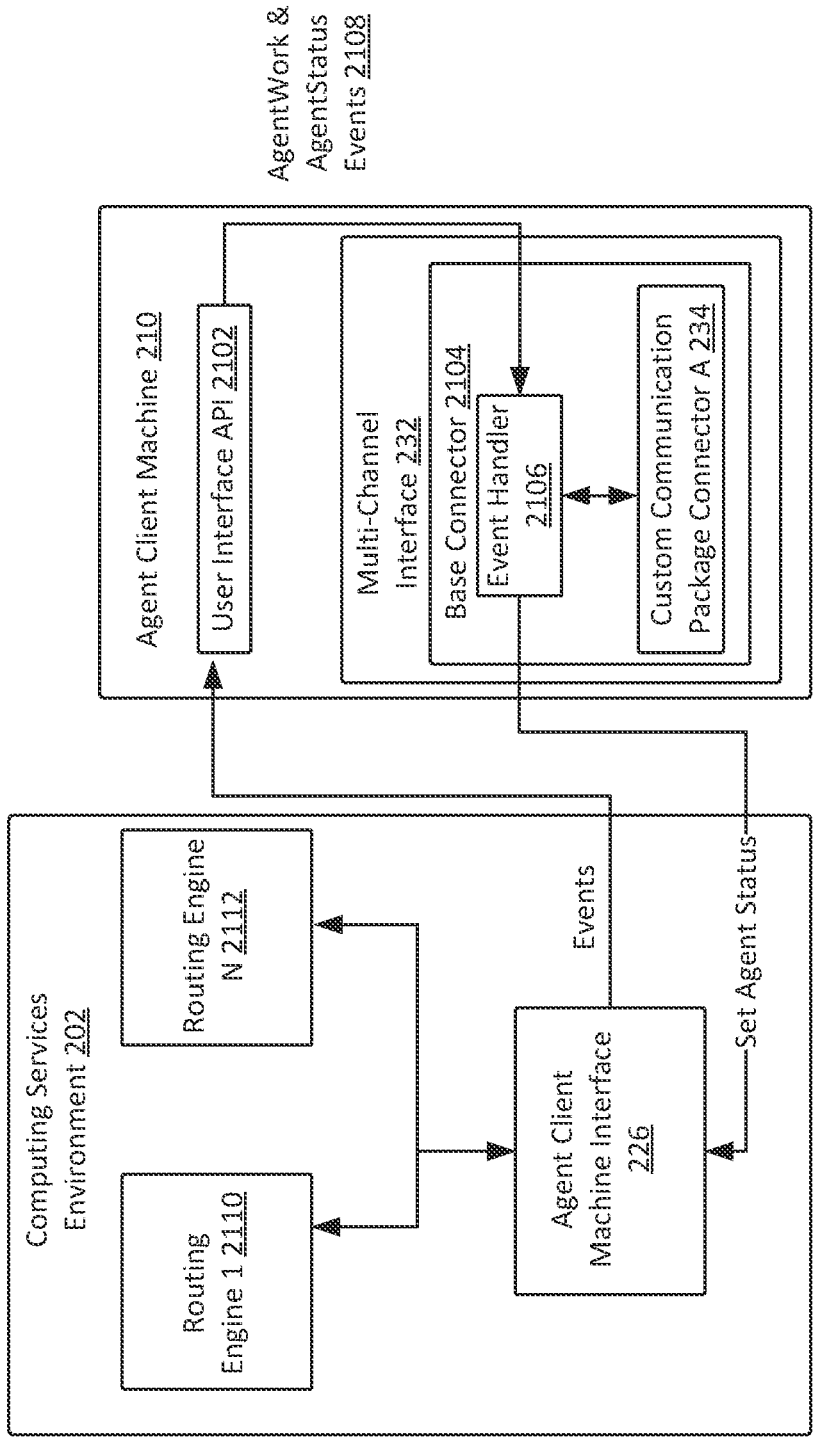
FIG. 21 illustrates a message passing diagram that provides additional details regarding the updating of agent-related information between the agent client machine and the computing services environment, configured in accordance with one or more embodiments.

FIG. 21 illustrates a message passing diagram that provides additional details regarding the updating of agent-related information between the agent client machine 210 and the computing services environment 202, configured in accordance with one or more embodiments.

In FIG. 21, the agent client machine interface 226 communicates with the routing engines 2110 and 2112 to share status information about agents, which may be used to determine proposed routes. Events such as work requests are transmitted to the agent client machine 210 via a user interface API 2102 associated with the web application user interface 230. From there, information such as agent work and agent status events 2108 can be transmitted to an event handler 2106 within a base connector component 2104 in the multi-channel interface 232. The event handler 2106 may then provide such information to the custom communication package connector 234, which is connected with the partner system 206. The event handler 2106 may also share information such as agent status information with the agent client machine interface 226. For instance, the event handler 2106 may indicate when the agent has accepted, rejected, or completed a work event. In this way, events and communication sessions across potentially multiple communication channels, multiple agents, multiple custom communication packages, and/or multiple partners may be seamlessly managed.

Figure 22:
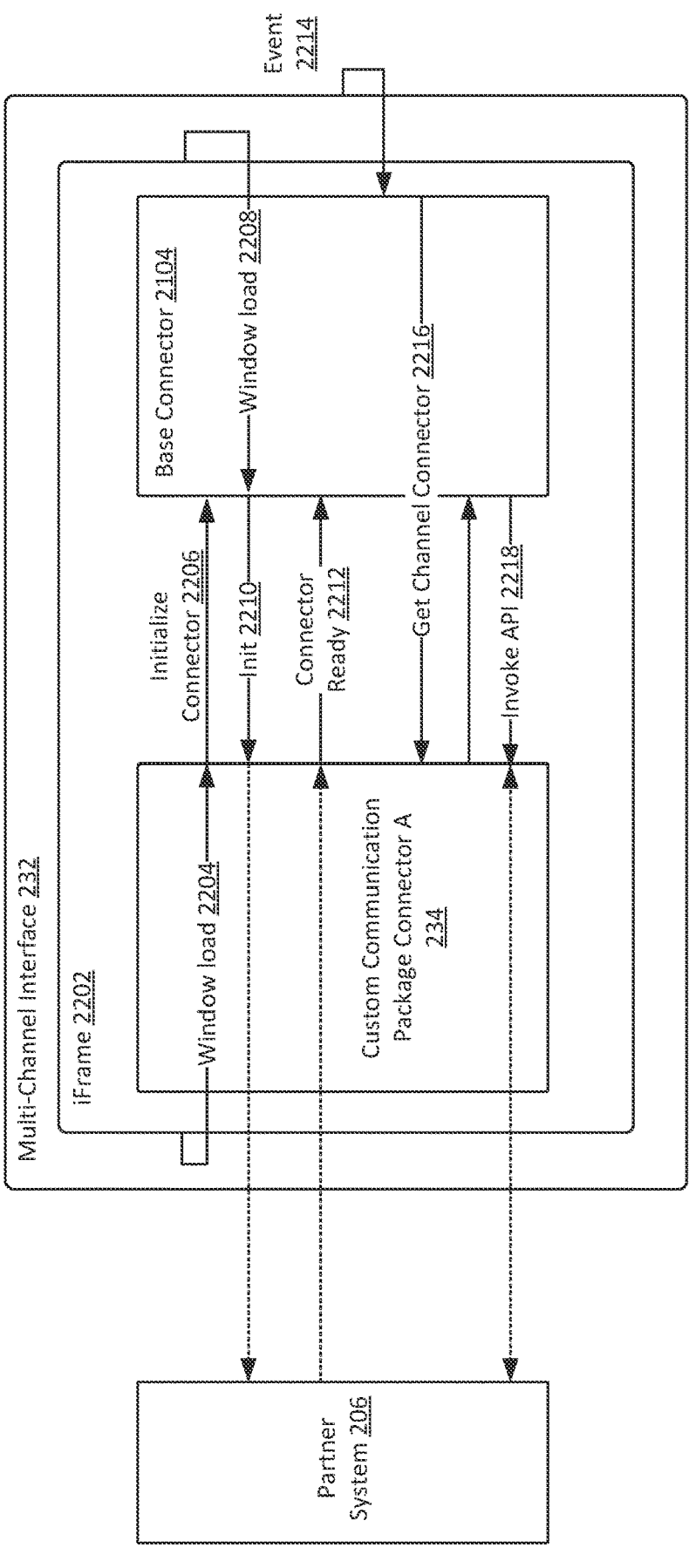
FIG. 22 illustrates a message passing diagram that provides additional details regarding communications transmitted within user interface components at the client machine and between such components and the partner system, configured in accordance with one or more embodiments.

FIG. 22 illustrates a message passing diagram that provides additional details regarding communications transmitted within user interface components at the client machine and between such components and the partner system 206, configured in accordance with one or more embodiments.

In FIG. 22, the multi-channel interface 232 includes a user interface component such as an iFrame 2202. The iFrame initiates requests at 2204 and 2208 to load the custom communication package connector 234 and the base connector component 2104. Upon loading, the custom communication package connector 234 sends an initialization request 2206 to the base connector component 2104. In response, the base connector component 2104 initializes the custom communication package connector 234 at 2210.

An indication that the connector has been initialized may also be sent to the partner system 206, which may send a confirmation message back to the custom communication package connector 234. Upon receiving the confirmation message, the connector identifies itself as ready at 2112. For instance, the connector may transmit information for showing that the agent client machine is logged in to the communication channel.

After initialization, an indication of a detected event is sent from the multi-channel interface 232 to the base connector component 2104 at 2114. According to various embodiments, any of various types of events may be detected. For example, the agent may accept or reject a work request for communication via the custom communication package connector 234 or via another communication channel. As another example, the agent may provide user input via the user interface indicating a request to transmit a message via the custom communication package connector 234. As yet another example, the agent may provide user input via the user interface indicating a request to perform another operation via the custom communication package connector 234, such as disconnecting from a communication session, transferring a communication session, accessing additional information via the communication session, or the like. The precise nature of such operations may depend on the particular communication channel being used.

At 2216, based on the event, the base connector component 2104 may communicate with the 234 at 2116 to get an appropriate channel connector. For instance, the base connector component 2104 may get a channel connector for communication via the communication channel accessed via the custom communication package connector 234 to perform an action such as telephony or message passing. The channel connector may then be returned by the custom communication package connector 234.

At 2218, the base connector component 2104 may use the channel connector to invoke a channel API. For instance, the base connector component 2104 may use the channel connector to send a message or conduct voice communication via the communication channel. Such operations may be performed via the partner system 206.

Figure 23:
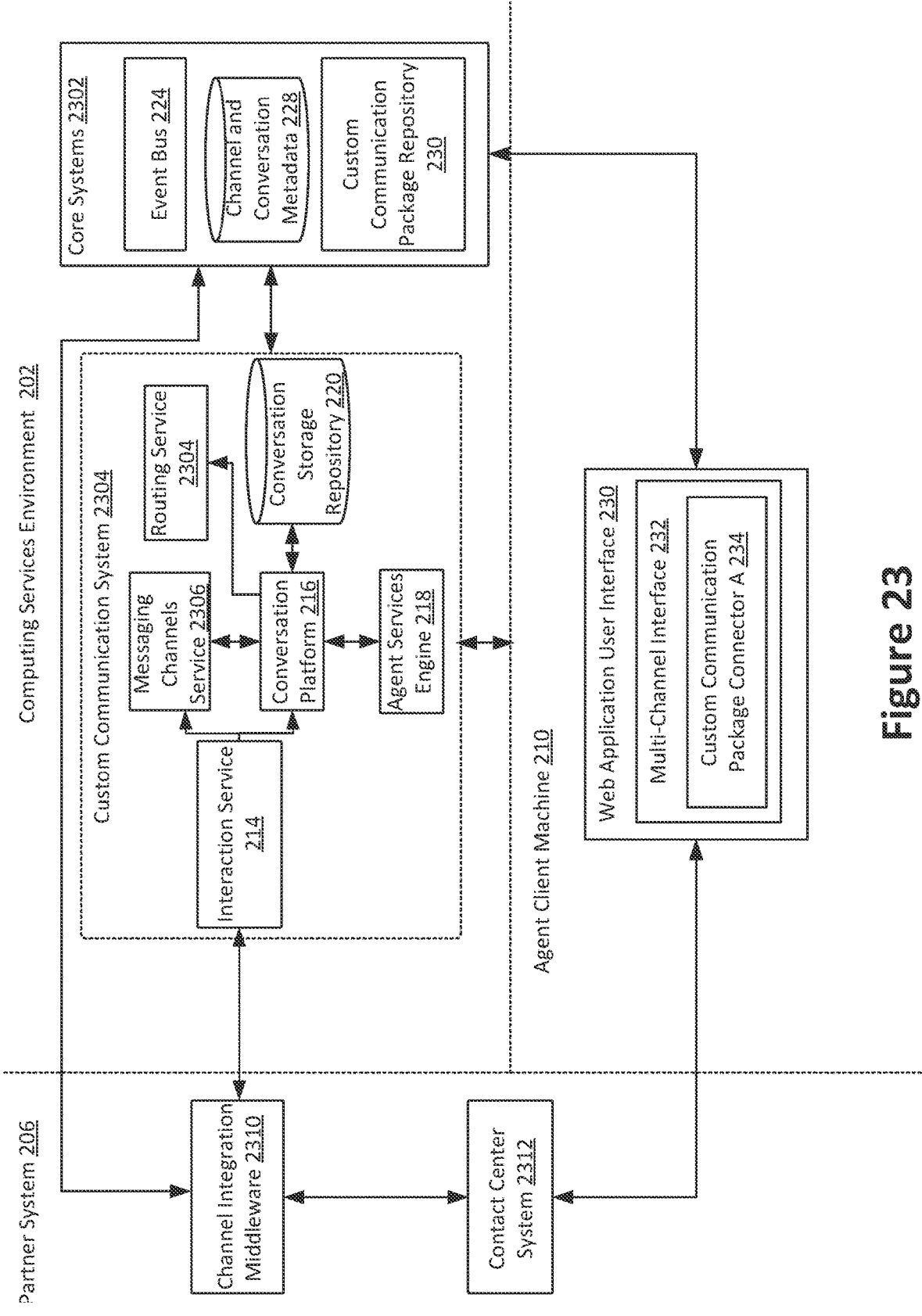
FIG. 23 illustrates a message passing diagram, configured in accordance with one or more embodiments.

FIG. 23 illustrates a message passing diagram, configured in accordance with one or more embodiments. The message passing diagram shown in FIG. 23 illustrates at a high level a combined view of elements discussed elsewhere in the application, such as with respect to FIG. 19, FIG. 20, FIG. 21, and FIG. 22.

Many of the elements shown in FIG. 23 are presented elsewhere in the application and are not described herein the interests of brevity. The event bus 224, channel and conversation metadata repository 228, and web application user interface 230 are grouped within core systems 2302 within the computing services environment 202. In addition to other components already discussed, the routing service 2304 includes a routing service 2304. The partner system 206 includes a channel integration middleware layer 2310 in communication with a contact center system 2312.

According to various embodiments, the core systems 2302 may include a variety of components related to the computing services environment 202. For instance, the core systems 2302 may include one or more application servers for providing web services, one or more database systems, and the like. The messaging channels service 2306 may perform various operations discussed with respect to the API service 212 and interaction service 214 shown in FIG. 2. The routing service routing service 2304 may perform routing for communication sessions, for instance those that are not routed by a partner. The channel integration middleware layer 2310 may facilitate communication with the computing services environment 202, while the contact center system 2312 may facilitate communication with the agent client machine 210.

One example of a lifecycle for a communication session is as follows. First, the partner system 206 communications with the interaction service 214 to create a conversation and messaging session. Second, the partner calls the interaction service 214 to execute a flow associated with the messaging channel for the messaging session. Third, the partner selects an agent and transmits an instruction to the interaction service 214 to create an agent work item. Fourth, the agent services engine 218 transmits a work request to the agent client machine 210. The partner may then be notified when the work is shown, accepted, or declined. Fifth, messages transmitted from the end point to the agent or transmitted from the agent to the end point are posted to the event bus 224 where they may be forwarded to their ultimate destination.

CONCLUSION

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of customer relations management applications. However, the techniques disclosed herein apply to a wide variety of computing services. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method performed at a computing services environment including a database system, the method comprising:
receiving a request at a communication interface to establish a communication session from an end point to a tenant of the computing services environment, the request being received from an external computing system managed by an external entity in accordance with a designated communication package definition configured by the external entity and defining access information for a designated communication channel outside of the computing services environment;
determining, using a generative language model, routing configuration information for the request based on a prompt template and communication session characteristics determined based on the designated communication package definition, the generative language model being tuned based on tenant communications and activity within the computing services environment;
determining via a processor an agent account of a plurality of agent accounts associated with the tenant, the agent account being determined based on routing configuration information generated by the generative language model based on a prompt completion, wherein text generated by the generative language model determines, at least in part, a communication route to the agent account through the computing services environment;
establishing the communication session via the designated communication channel from the end point through the external computing system and the computing services environment to a first client machine authenticated to the agent account; and
transmitting one or more messages from the end point to the first client machine via the communication session.

2. The method recited in claim 1, wherein the one or more messages are transmitted from the end point to the first client machine via the external entity and the database system.

3. The method recited in claim 1, wherein determining the agent account comprises:
determining an input prompt including a natural language instruction to identify the agent account, and
determining a prompt completion by providing the input prompt to a generative language model, the prompt completion including novel text determined by the generative language model, the agent account being identified based on the novel text.

4. The method recited in claim 3, wherein the input prompt includes one or more natural language request characteristics characterizing the request in natural language.

5. The method recited in claim 3, wherein the input prompt includes one or more natural language agent characteristics characterizing some or all of the plurality of agents in natural language.

6. The method recited in claim 1, wherein the designated communication package definition is one of a plurality of communication package definition stored within the database system, the plurality of communication package definitions providing access to a plurality of external communication channels including the designated communication channel.

7. The method recited in claim 1, wherein the designated communication package definition references one or more custom database system entities in the database system, the one or more custom database system entities being linked with an external entity database system account corresponding with the external computing system.

8. The method recited in claim 1, the method further comprising:
receiving a rerouting request from the first client machine to reroute the communication session; and
transmitting a second one or more messages from the end point to a second client machine via the communication session.

9. The method recited in claim 8, the method further comprising:
determining a second agent account of the plurality of agent accounts, wherein the second client machine is authenticated to the second agent account.

10. The method recited in claim 8, wherein the second client machine is not authenticated to the computing services environment.

11. The method recited in claim 1, wherein the designated communication package definition includes an authorization link determined based on a conversation channel definition name and an external entity identifier uniquely identifying the external entity in the database system, the authorization link providing access to the designated communication channel by the first client machine.

12. The method recited in claim 1, wherein the computing services environment includes an event bus storing a plurality of events generated in accordance with the designated communication package definition, one or more of the events corresponding with one or more response messages transmitted from the first client machine to the end point.

13. The method recited in claim 12, wherein the computing services environment also includes a publish and subscribe service that provides access to the plurality of events by the external computing system.

14. The method recited in claim 1, wherein the computing services environment includes a conversation storage repository storing a plurality of conversation records associated with the one or more messages.

15. A computing services environment including a database system, the computing services environment comprising:

a communication interface configured to receive a request at to establish a communication session from an end point to a tenant of the computing services environment, the request being received from an external computing system managed by an external entity in accordance with a designated communication package definition configured by the external entity and defining access information for a designated communication channel outside of the computing services environment;

a processor configured to determine, using a generative language model, routing configuration information for the request based on a prompt template and communication session characteristics determined based on the designated communication package definition, the generative language model being tuned based on tenant communications and activity within the computing services environment;

the processor being further configured to determine an agent account of a plurality of agent accounts associated with the tenant, the agent account being determined based on routing configuration information generated by the generative language model based on a prompt completion, wherein text generated by the generative language model determines, at least in part, a communication route to the agent account through the computing services environment; and a custom communication system configured to establish the communication session via the designated communication channel from the end point through the external computing system and the computing services environment to a first client machine authenticated to the agent account and to transmit one or more messages from the end point to the first client machine via the communication session.

16. The computing services environment recited in claim 15, wherein the one or more messages are transmitted from the end point to the first client machine via the external entity and the database system.

17. The computing services environment recited in claim 15, wherein determining the agent account comprises:

determining an input prompt including a natural language instruction to identify the agent account, and determining a prompt completion by providing the input prompt to a generative language model, the prompt completion including novel text determined by the generative language model, the agent account being identified based on the novel text.

18. The computing services environment recited in claim 17, wherein the input prompt includes one or more natural language request characteristics characterizing the request in natural language.

19. One or more non-transitory computer readable media having instructions stored thereon for performing a method at a computing services environment including a database system, the method comprising:

receiving a request at a communication interface to establish a communication session from an end point to a tenant of the computing services environment, the request being received from an external computing system managed by an external entity in accordance with a designated communication package definition configured by the external entity and defining access information for a designated communication channel outside of the computing services environment;

determining, using a generative language model, routing configuration information for the request based on a prompt template and communication session characteristics determined based on the designated communication package definition, the generative language model being tuned based on tenant communications and activity within the computing services environment;

determining via a processor an agent account of a plurality of agent accounts associated with the tenant, the agent account being determined based on routing configuration information generated by the generative language model based on a prompt completion, wherein text generated by the generative language model determines, at least in part, a communication route to the agent account through the computing services environment;

establishing the communication session via the designated communication channel from the end point through the external computing system and the computing services environment to a first client machine authenticated to the agent account; and transmitting one or more messages from the end point to the first client machine via the communication session.

20. The one or more non-transitory computer readable media recited in claim 19, wherein determining the agent account comprises:

determining an input prompt including a natural language instruction to identify the agent account, wherein the input prompt includes one or more natural language request characteristics characterizing the request in natural language and one or more natural language agent characteristics characterizing some or all of the plurality of agents in natural language, and determining a prompt completion by providing the input prompt to a generative language model, the prompt completion including novel text determined by the generative language model, the agent account being identified based on the novel text.

* * * * *